United States Patent
Suzumura et al.

(10) Patent No.: US 11,242,701 B2
(45) Date of Patent: Feb. 8, 2022

(54) VEHICLE DOOR LOCK DEVICE

(71) Applicant: AISIN SEIKI KABUSHIKI KAISHA, Kariya (JP)

(72) Inventors: Makoto Suzumura, Chita (JP); Kenji Okada, Anjo (JP); Toru Kanazawa, Toyota (JP); Yasuhiko Sono, Hekinan (JP)

(73) Assignee: AISIN CORPORATION, Kariya (JP)

( * ) Notice: Subject to any disclaimer, the term of this patent is extended or adjusted under 35 U.S.C. 154(b) by 357 days.

(21) Appl. No.: 16/329,773

(22) PCT Filed: Mar. 14, 2017

(86) PCT No.: PCT/JP2017/010097
§ 371 (c)(1),
(2) Date: Mar. 1, 2019

(87) PCT Pub. No.: WO2018/051548
PCT Pub. Date: Mar. 22, 2018

(65) Prior Publication Data
US 2019/0242162 A1 Aug. 8, 2019

(30) Foreign Application Priority Data

Sep. 13, 2016 (JP) .............................. JP2016-178715

(51) Int. Cl.
*E05B 85/24* (2014.01)
*E05B 81/66* (2014.01)
(Continued)

(52) U.S. Cl.
CPC .............. *E05B 85/243* (2013.01); *B60J 5/00* (2013.01); *E05B 79/08* (2013.01); *E05B 81/66* (2013.01);
(Continued)

(58) Field of Classification Search
CPC .......... B60J 5/00; E05B 85/243; E05B 85/02; E05B 85/24; E05B 79/08; E05B 81/66
See application file for complete search history.

(56) References Cited

U.S. PATENT DOCUMENTS

| | | | |
|---|---|---|---|
| 2002/0008389 A1* | 1/2002 | Nomura ................... | E05B 85/16 |
| | | | 292/336.3 |
| 2017/0268264 A1* | 9/2017 | Suzumura ............... | E05B 79/16 |

(Continued)

FOREIGN PATENT DOCUMENTS

| | | |
|---|---|---|
| GB | 2527648 A | 12/2015 |
| JP | 4407782 B2 | 2/2010 |

(Continued)

OTHER PUBLICATIONS

International Search Report (PCT/ISA/210) dated May 16, 2017, by the Japan Patent Office as the International Searching Authority for International Application No. PCT/JP2017/010097.
(Continued)

*Primary Examiner* — Kristina R Fulton
*Assistant Examiner* — James Edward Ignaczewski
(74) *Attorney, Agent, or Firm* — Buchanan Ingersoll & Rooney PC

(57) ABSTRACT

Provided is a vehicle door lock device having a structure enabling easy mounting of a pivot lever and urging means configured to urge the pivot lever to pivot. The urging means locked to a base member and the pivot lever does not generate an urging force when the pivot lever is positioned at an outside position at which the pivot lever is positioned on one direction side with respect to an in-operation pivoting range, and when the pivot lever pivots from the outside position to the in-operation pivoting range, an elastic deformation piece climbs over a temporary stopper while being elastically deformed, and the urging means locked to the
(Continued)

base member and the pivot lever is elastically deformed to generate the urging force.

5 Claims, 23 Drawing Sheets

(51) Int. Cl.
   *E05B 85/02* (2014.01)
   *B60J 5/00* (2006.01)
   *E05B 79/08* (2014.01)
(52) U.S. Cl.
   CPC .............. *E05B 85/02* (2013.01); *E05B 85/24* (2013.01); *E05Y 2900/531* (2013.01)

(56) References Cited

U.S. PATENT DOCUMENTS

2017/0321456 A1* 11/2017 Jeong ...................... E05B 81/20
2019/0242162 A1* 8/2019 Suzumura ............... E05B 85/02

FOREIGN PATENT DOCUMENTS

| JP | 4701075 B2 * | 6/2011 |
| JP | 4701075 B2 | 6/2011 |
| JP | 2016098589 A | 5/2016 |

OTHER PUBLICATIONS

Written Opinion (PCT/ISA/237) dated May 16, 2017, by the Japan Patent Office as the International Searching Authority for International Application No. PCT/JP2017/010097.

* cited by examiner

VEHICLE DOOR LOCK DEVICE

TECHNICAL FIELD

The present invention relates to a vehicle door lock device.

BACKGROUND ART

Hitherto, there has been known a vehicle door lock device, which is provided to a door capable of opening and closing a door opening formed in a peripheral surface of a vehicle body.

The door lock device of this type includes a latch mechanism and a housing. The latch mechanism is capable of keeping a vehicle door in a closed state through engagement with a striker fixed to the vehicle body when the door is closed. The housing is configured to accommodate the latch mechanism. Further, the latch mechanism includes a latch and a pole. The latch is pivotable, and is engageable and disengageable with the striker. The pole is pivotable, and is engageable and disengageable with the latch.

The latch is pivotable between an unlatched position at which the latch is not engaged with the striker (at which the latch does not keep the closed state of the vehicle door), and a fully-latched position at which the latch can hold the striker (at which the latch keeps the closed state of the vehicle door). The pole is pivotable between an engaged position at which the pole holds the latch at the fully-latched position through engagement with the latch positioned at the fully-latched position, and a disengaged position at which the pole is separated from the latch.

Further, an urging force of urging means causes the latch to be always urged to pivot to the unlatched position side, and causes the pole to be always urged to pivot to the engaged position side.

Further, a striker entry groove is formed in the housing. The striker enters the striker entry groove when the vehicle door is closed.

Further, there has been known a door lock device including a courtesy switch (door switch) configured to detect whether the latch is positioned at the fully-latched position or the unlatched position (for example, Patent Literature 1).

The applicant of the present invention has proposed a door lock device including a courtesy switch, and a switch lever configured to link a latch and the courtesy switch with each other and to pivot in interlock with a change in pivoting position of the latch (for example, Patent Literature 1).

A supported portion of the switch lever is supported on a pivot support shaft provided on a housing so that the switch lever is pivotable.

The door lock device further includes a lever spring being a torsion coil spring. The lever spring is mounted to the switch lever and the housing in a state of being elastically deformed. More specifically, one end of the lever spring is locked to the switch lever, and the other end of the lever spring is locked to the housing. Accordingly, the lever spring urges the switch lever to pivot in one direction.

Further, the courtesy switch is connected to an electronic control unit (hereinafter referred to as "ECU") provided to a vehicle, and the ECU is connected to a lighting device provided inside the vehicle.

In the door lock device, when the latch is positioned at the fully-latched position, the switch lever is positioned, by a pivot urging force of the lever spring, at a pivoting position at which the switch lever does not press the courtesy switch. Thus, the courtesy switch is switched to an OFF state. At this time, the ECU turns off the lighting device.

Meanwhile, when the latch pivots to the unlatched position, the switch lever pivots against the pivot urging force of the lever spring to press the courtesy switch. Accordingly, the courtesy switch is switched to an ON state. At this time, the ECU turns on the lighting device.

CITATION LIST

Patent Literature

[PTL 1] JP 2016-98589 A (Japanese Unexamined Patent Application Publication No. 2016-98589)

SUMMARY OF INVENTION

Technical Problem

The switch lever and the lever spring are mounted to the housing by a first method or a second method described below.

The first method is carried out through the following procedures.

First, a worker integrates the switch lever and the lever spring with each other, for example, by hand.

Next, the worker mounts the supported portion of the switch lever to the pivot support shaft of the housing, for example, by hand so that the switch lever is pivotable.

Next, the worker locks one of both end portions of the lever spring to one of the switch lever and the housing, for example, by hand.

Further, the worker locks the other of the both end portions of the lever spring to the other of the switch lever and the housing, for example, by hand while elastically deforming the lever spring.

The second method is carried out through the following procedures.

First, a worker integrates the switch lever and the lever spring with each other, for example, by hand.

Next, the worker locks, for example, by hand, one of both end portions of the lever spring to one of the switch lever and the housing, and locks the other of the both end portions of the lever spring to the other of the switch lever and the housing.

Further, the worker mounts the supported portion of the switch lever to the pivot support shaft of the housing, for example, by hand so that the switch lever is pivotable.

However, in a final step in each of the first and second methods, the worker is required to apply a force to a part of the lever spring, for example, by hand so as to keep an elastically deformed state of the lever spring.

As a result, work of mounting the switch lever and the lever spring to the housing has not been easy.

It is an object of the present invention to provide a vehicle door lock device having a structure enabling easy mounting of a pivot lever and urging means configured to urge the pivot lever to pivot.

Solution to Problem

According to one embodiment of the present invention, there is provided a vehicle door lock device, including: a base member which is fixed to a vehicle door supported on a vehicle body so as to be pivotable; a pivot lever which is supported on the base member so as to be pivotable; and urging means which is provided between the base member and the pivot lever and is configured to generate an urging force for causing the pivot lever to pivot in one direction when the urging means is locked to the base member and the pivot lever so as to be elastically deformed in a predetermined mode, wherein the base member includes one of a temporary stopper and an elastic deformation piece, wherein the pivot lever includes the other of the temporary stopper and the elastic deformation piece, wherein the one of the temporary stopper and the elastic deformation piece is positioned on a pivoting path of the other of the temporary stopper and the elastic deformation piece when the pivot lever pivots, wherein the urging means locked to the base member and the pivot lever does not generate the urging force when the pivot lever is positioned at an outside position at which the pivot lever is positioned on the one direction side with respect to a predetermined in-operation pivoting range, and wherein, when the pivot lever pivots from the outside position to the in-operation pivoting range, the elastic deformation piece climbs over the temporary stopper while being elastically deformed, and the urging means locked to the base member and the pivot lever is elastically deformed to generate the urging force.

In the present invention, even under a state in which the urging means is locked to the base member and the pivot lever, the urging means is prevented from being elastically deformed when the pivot lever is positioned at the outside position. In other words, the urging means does not generate the urging force.

Further, when the pivot lever, which is supported on the base member so as to be pivotable and is positioned at the outside position, is caused to pivot by a worker, for example, by hand to the in-operation pivoting range, the elastic deformation piece climbs over the temporary stopper while being elastically deformed. Accordingly, at this time, even when the worker does not apply a large force to the pivot lever, the elastic deformation piece can climb over the temporary stopper. That is, at this time, the worker can easily cause the pivot lever to pivot.

Further, when the pivot lever is caused to pivot from the outside position to the in-operation pivoting range, the urging means is elastically deformed to generate the urging force for urging the pivot lever to the outside position side. However, the worker causes the pivot lever having a pivoting path determined by the base member to pivot, to thereby move the pivot lever from the outside position to the in-operation pivoting range. Therefore, at this time, although the urging force generated by the urging means is applied to, for example, hand of the worker as a load, the worker can easily cause the pivot lever to pivot to the in-operation pivoting range.

The pivot lever may include at least one of: a latch which is pivotable within the in-operation pivoting range between a fully-latched position at which the latch keeps the vehicle door in a closed state through engagement with a striker mounted to the vehicle body and an unlatched position at which the latch releases the striker; a latch interlocking lever which includes a lever configured to pivot within the in-operation pivoting range in interlock with the latch or/and the latch; a handle interlocking lever which is configured to pivot within the in-operation pivoting range in interlock with pivoting operation of a handle supported on the vehicle door so as to be pivotable and is configured to cause the latch to pivot to the unlatched position when the handle interlocking lever pivots in a predetermined direction in a predetermined lock releasable state; and an active lever interlocking lever which is configured to pivot within the in-operation pivoting range in interlock with a pivoting motion of an active lever that produces the lock releasable state when pivoting to a predetermined position.

The base member may include the temporary stopper, and the pivot lever may include the elastic deformation piece.

With the above-mentioned configuration of the present invention, as compared to a case in which the elastic deformation piece is formed on the base member, the elastic deformation piece can be easily manufactured.

The base member may include: a first base member which is configured to support the pivot lever so as to enable the pivot lever to pivot, the urging means being locked to the first base member; and a second base member which is mountable to and dismountable from the first base member. The second base member may include an assembly-completion stopper configured to separate the temporary stopper and the elastic deformation piece from each other and to position the pivot lever within the in-operation pivoting range through contact with the pivot lever when the second base member is mounted to the first base member and the pivot lever is positioned within the in-operation pivoting range.

In order to allow the elastic deformation piece to easily climb over the temporary stopper, for example, it is required that a mechanical strength of the elastic deformation piece be set low. However, in a case in which the mechanical strength of the elastic deformation piece is set low, when the temporary stopper and the elastic deformation piece are held in contact with each other for a long time by the pivot urging force of the urging means, the elastic deformation piece may be broken by the load applied from the temporary stopper. Further, in this case, under a state in which the temporary stopper and the elastic deformation piece are held in contact with each other, when an external force other than the urging force of the urging means is applied to the pivot lever so that the temporary stopper and the elastic deformation piece are brought into contact with each other by a strong force, the elastic deformation piece may be broken by a strong load applied from the temporary stopper to the elastic deformation piece.

However, with the above-mentioned configuration of the present invention, when the second base member is mounted to the first base member under a state in which the pivot lever is positioned within the in-operation pivoting range, the pivot lever, which is urged to pivot by the urging means, is brought into contact with the assembly-completion stopper of the second base member. Then, the temporary stopper and the elastic deformation piece are separated from each other. Accordingly, no load is applied from the temporary stopper to the elastic deformation piece.

Therefore, a risk of breakage of the elastic deformation piece can be reduced while the mechanical strength of the elastic deformation piece is set low so as to allow the elastic deformation piece to easily climb over the temporary stopper.

The vehicle door lock device may further include a switch configured to detect a pivoting position of the latch, and the pivot lever may be a switch lever configured to link the latch and the switch with each other and to switch the switch between an ON state and an OFF state in interlock with a change in pivoting position of the latch.

With the above-mentioned configuration of the present invention, the switch lever and the urging means can be easily mounted to the base member.

DESCRIPTION OF EMBODIMENTS

Now, an embodiment of the present invention is described with reference to the attached drawings.

Figure 1:
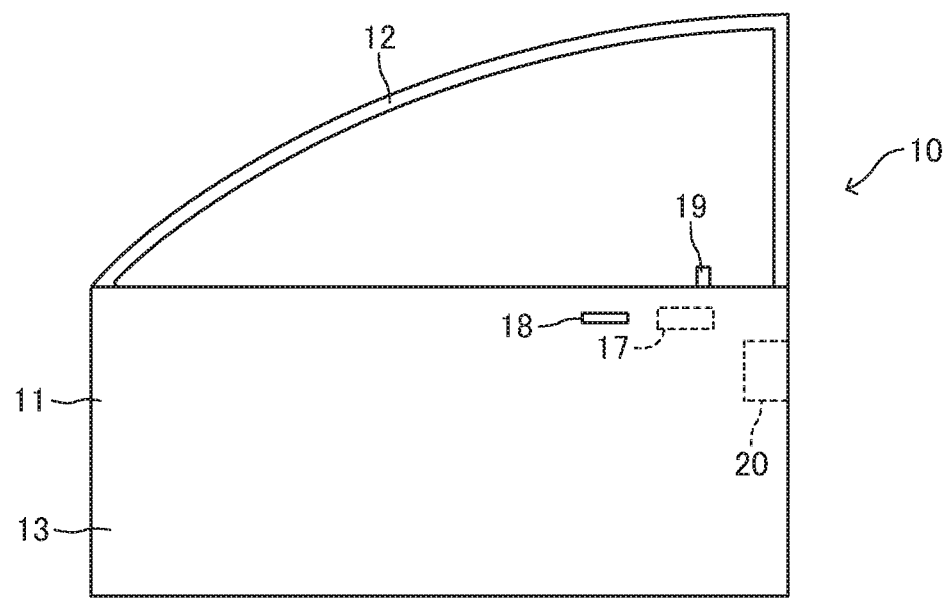
FIG. 1 is a side view for illustrating a right vehicle door including a vehicle door lock device according to an embodiment of the present invention as seen from an inner side of the vehicle.

A vehicle door 10 illustrated in FIG. 1 is a right side door of a vehicle, and the vehicle door 10 is supported at a front end portion thereof on a vehicle body (not shown) so as to be pivotable about a pivot axis extending in upward and downward direction. The vehicle door 10 is pivotable in a horizontal direction with respect to the vehicle body between an opened position of completely opening an opening portion formed in a side surface of the vehicle body, and a closed position of closing the opening portion. In the following description, "frontward and rearward direction" and "leftward and rightward direction (vehicle inward and outward direction)" relating to the vehicle door 10 refer to directions when the vehicle door 10 is positioned at the closed position.

The vehicle door 10 includes a door body portion 11 constructing a lower half portion of the vehicle door 10, and a door sash 12 formed at an upper half portion thereof. The door body portion 11 includes an outer panel (not shown) constructing an outer side surface of the door body portion 11, an inner panel (not shown) fixed to an inner side surface of the outer panel, and a resin trim 13 that is fixed to an inner side surface of the inner panel and constructs an inner side surface of the door body portion 11.

An outside handle 17 (handle) is supported on the outer panel so as to be pivotable, and an inside handle 18 (handle) is supported on the trim 13 so as to be pivotable. Each of the outside handle 17 and the inside handle 18 is pivotable between an initial position and a latch releasing position, and is urged to pivot toward the initial position by urging means (not shown).

In addition, a lock knob 19 is arranged at an upper end portion of the trim 13 so as to be slidable in the upward and downward direction. The lock knob 19 is slidable with respect to the trim 13 between an unlocked position (position illustrated in FIG. 1) and a locked position (not shown) located below the unlocked position.

A door lock device 20 is arranged inside the vehicle door 10 so as to be positioned between the outer panel and the inner panel and partially exposed from a rear end surface of the vehicle door 10.

Figure 2:
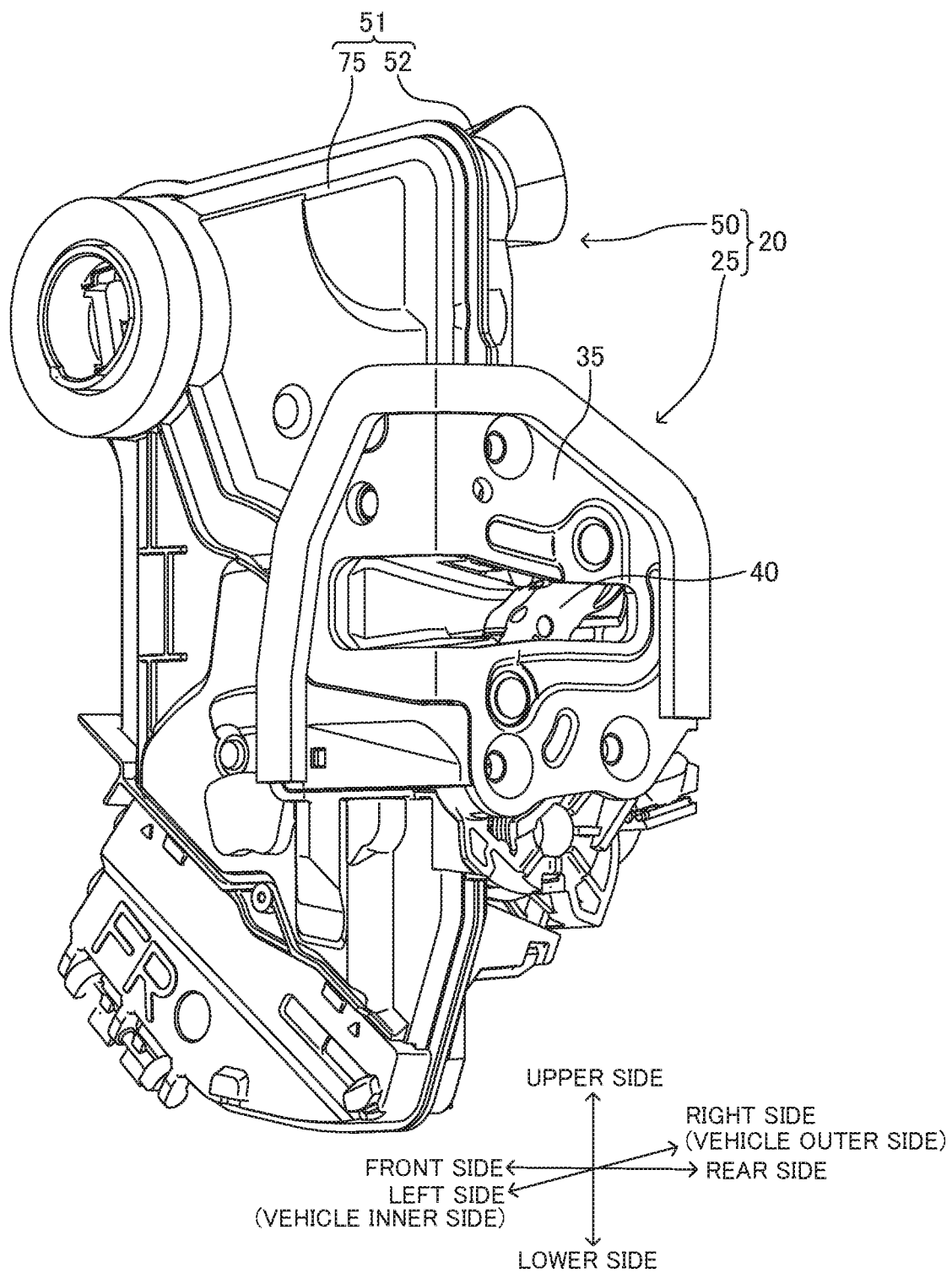
FIG. 2 is a perspective view for illustrating the door lock device as seen from a rear side on a vehicle inner side.
Figure 3:
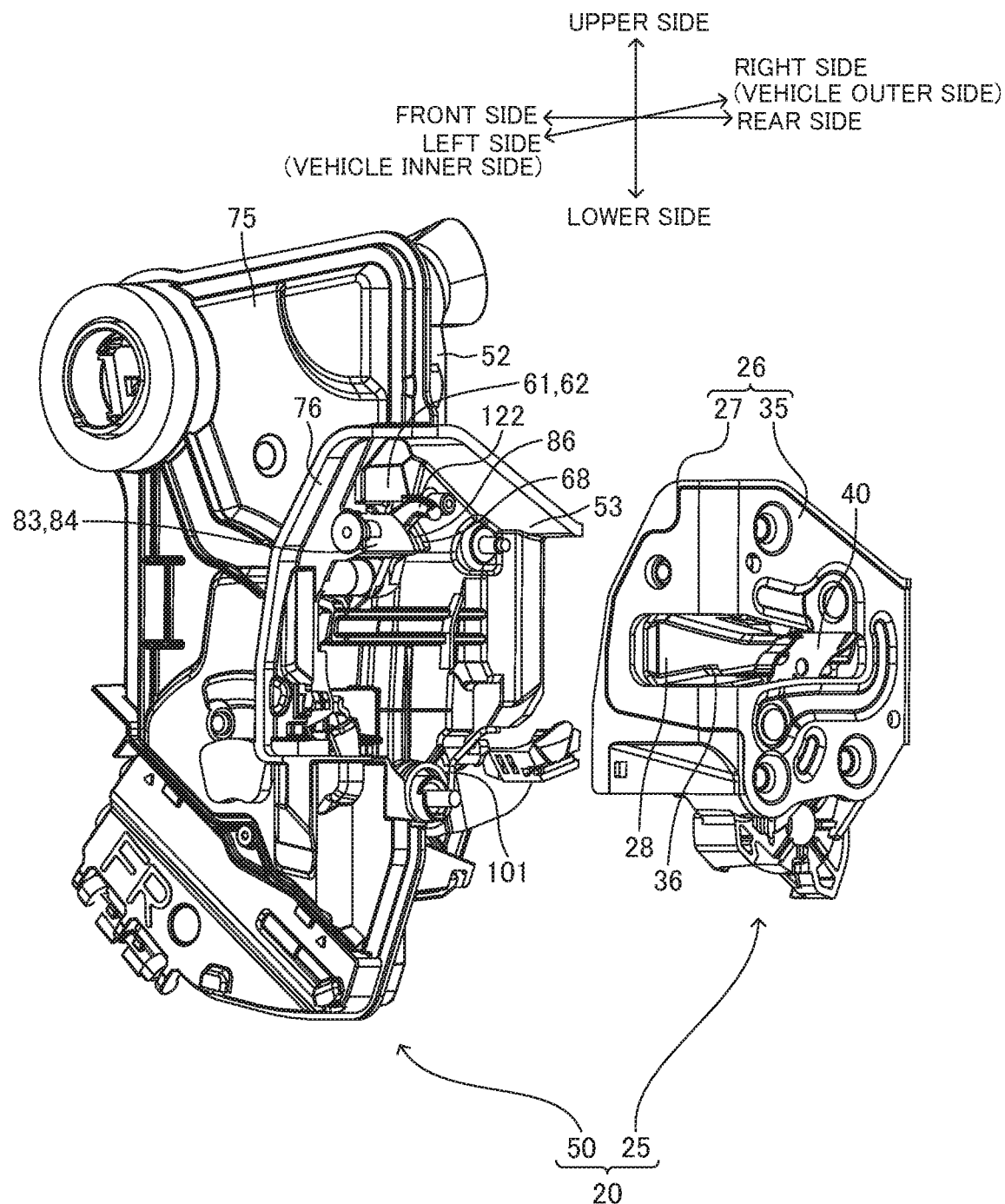
FIG. 3 is a perspective view for separately illustrating a latch unit and an actuator unit of the door lock device as seen from the vehicle inner side when a latch is positioned at an unlatched position.

As illustrated in FIG. 2, FIG. 3, and the like, the door lock device 20 includes a latch unit 25 and an actuator unit 50 integrated with each other.

The latch unit 25 includes a latch housing 26 having a first housing 27 and a second housing 35.

Figure 4:
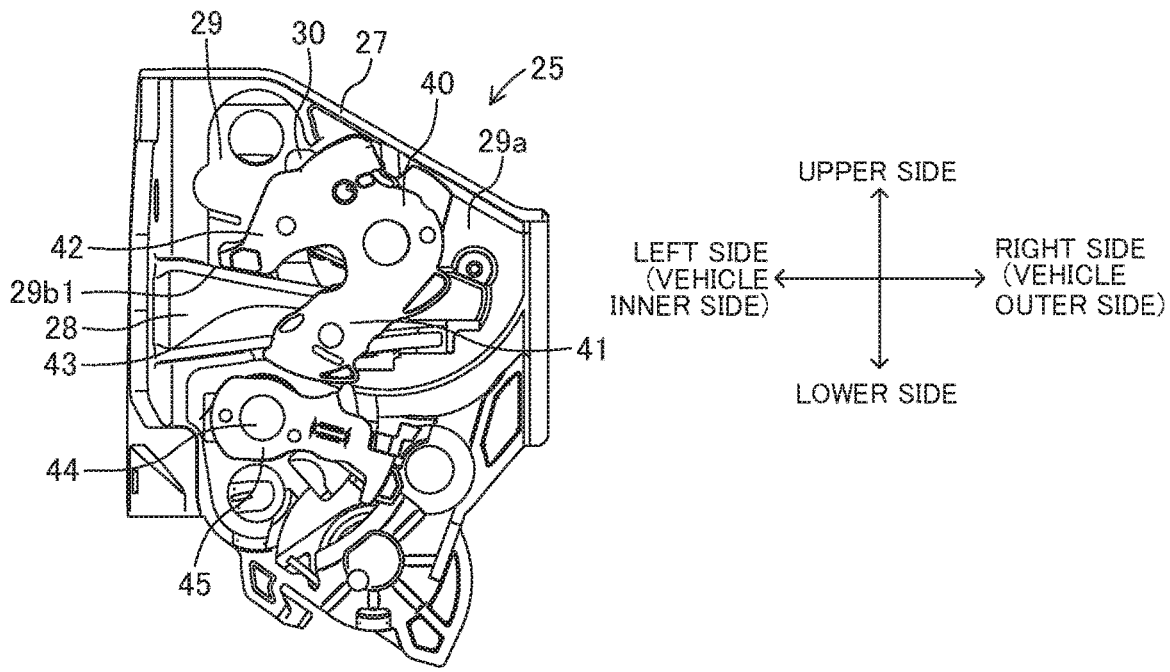
FIG. 4 is a back view for illustrating the latch unit when the latch is positioned at the unlatched position under a state in which a second housing is dismounted.
Figure 6:
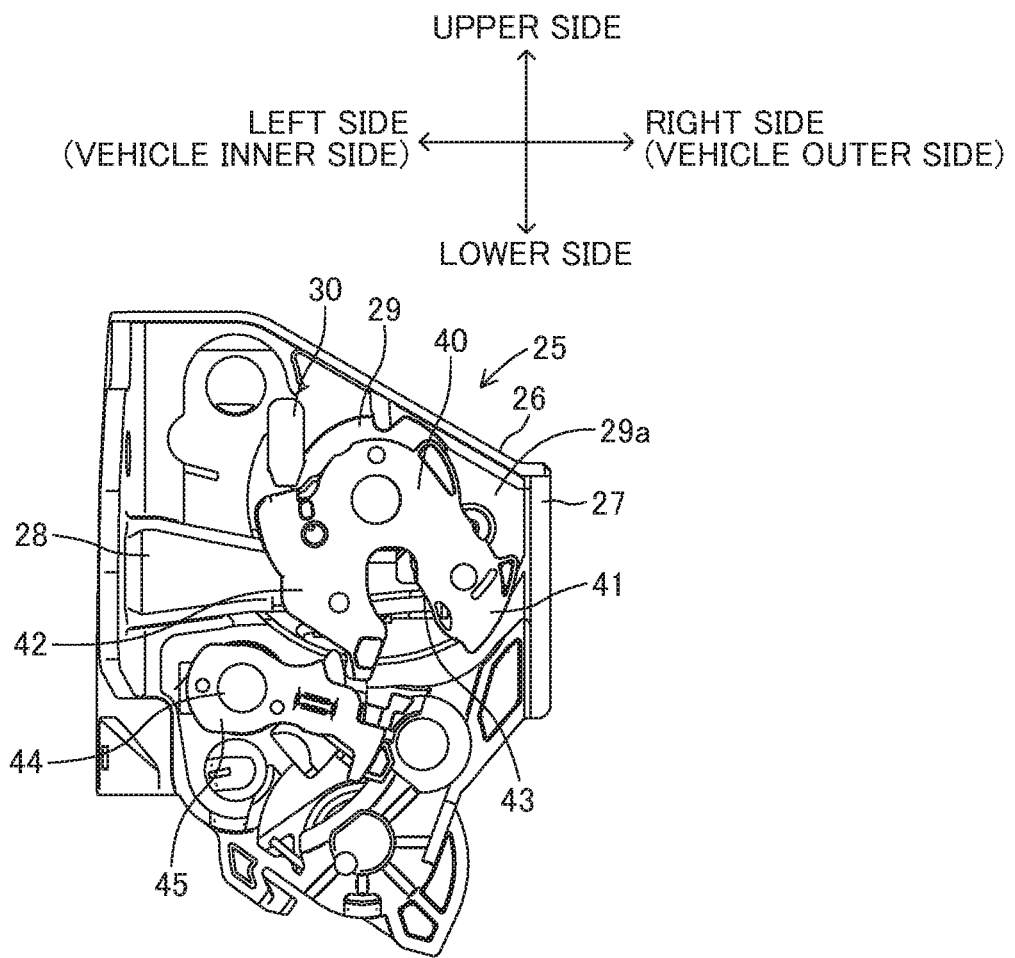
FIG. 6 is a back view for illustrating the latch unit when the latch is positioned at a fully-latched position under a state in which the second housing is dismounted.

A striker entry groove 28 is formed in a rear surface of the first housing 27 to extend rightward from a left end surface (end surface on the vehicle inner side) of the first housing 27. Further, as illustrated in FIG. 4 and FIG. 6, a mounting recessed portion 29 is formed in the rear surface of the first housing 27 to be continuous with (communicate with) the striker entry groove 28 in a manner of crossing the striker entry groove 28. A through-hole 30 is formed in a bottom surface of the mounting recessed portion 29 to pass through the first housing 27 in the frontward and rearward direction. As illustrated in the drawings, the through-hole 30 is a long hole extending in the upward and downward direction.

A striker entry groove 36 is formed in a rear portion and a left side portion of the second housing 35 to extend in the leftward and rightward direction.

A latch 40, a pole 45, and a lift lever 48 are supported on the first housing 27 so as to be pivotable.

The latch 40 (pivot lever) is arranged in the mounting recessed portion 29, and is supported so as to be pivotable about a pivot shaft formed on a support wall 29*a* that is the bottom surface of the mounting recessed portion 29. The latch 40 is pivotable with respect to the first housing 27 between an unlatched position at which the latch 40 does not hold a striker (not shown) fixed to the vehicle body (at which the latch 40 does not keep a closed state of the vehicle door 10), and a fully-latched position at which the latch 40 can hold the striker (at which the latch 40 keeps the closed state of the vehicle door 10). The latch 40 includes a first locking claw 41 and a second locking claw 42, and a striker receiving groove 43 is formed between the first locking claw 41 and the second locking claw 42. As illustrated in FIG. 22 to FIG. 29, a first engagement surface 40*a* and a second engagement surface 40*b* are formed on an outer surface of the latch 40. The first engagement surface 40*a* is formed on a part of an outer peripheral surface of the latch 40. Meanwhile, the second engagement surface 40*b* is formed on a part of a front surface of the latch 40.

The pole 45 located below the latch 40 is arranged in the mounting recessed portion 29. The pole 45 passes through the first housing 27 in the frontward and rearward direction, and is fixed to a pivot shaft 44 that is pivotable relative to the first housing 27. Therefore, the pole 45 is pivotable together with the pivot shaft 44 between an engaged position (position illustrated in FIG. 6) of holding the latch 40 at the fully-latched position by engaging with the latch 40 positioned at the fully-latched position and a disengaged position (position illustrated in FIG. 4) of being separated from the latch 40.

Further, the urging means (for example, tension spring (not shown)) is mounted to the latch 40 and the pole 45. Further, an urging force of the urging means causes the latch 40 to be always urged to pivot to the unlatched position side, and causes the pole 45 to be always urged to pivot to the engaged position side.

Figure 5:
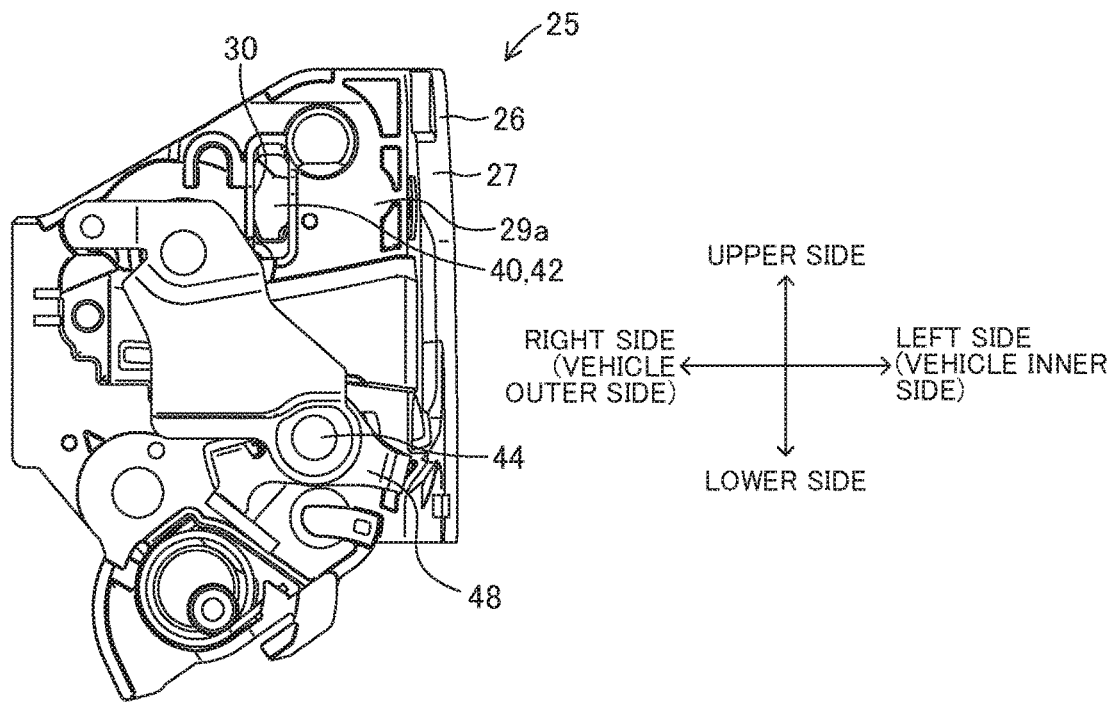
FIG. 5 is a front view for illustrating the latch unit when the latch is positioned at the unlatched position under a state in which the second housing is dismounted.

Still further, as illustrated in FIG. 5, the lift lever 48 is arranged in front of the first housing 27 so as to be opposed to a front surface of the first housing 27. The lift lever 48 is fixed to a front portion of the pivot shaft 44 protruding frontward from the front surface of the first housing 27. That is, the lift lever 48 pivots together with the pivot shaft 44 and the pole 45.

When the latch 40 positioned at the unlatched position pivots to the fully-latched position against the urging force of the urging means while being engaged with the striker, the pole 45 is shifted to the engaged position by the urging force of the urging means, and thus engaged with the latch 40. As a result, the latch mechanism including the latch 40 and the pole 45 is switched to the "latched state" in which the latch 40 holds the striker.

Meanwhile, when the pole 45 pivots to the disengaged position side against the urging force of the urging means, the latch 40 is pivotable to the unlatched position side. Accordingly, the latch mechanism is switched to the "unlatched state" in which the latch mechanism can release the striker.

From behind the first housing 27, the second housing 35 is put on the first housing 27 supporting the latch 40, the pole 45, and the lift lever 48, and then the first housing 27 and the second housing 35 are fixed to each other. In this manner, the latch unit 25 is completed (see FIG. 2, FIG. 3, and the like).

The actuator unit 50 illustrated in FIG. 8 to FIG. 14 includes an actuator housing 51 (base member) having a first housing 52 (first base member) and a second housing 75 (second base member).

The first housing 52 is an integrally molded resin product.

A latch unit connection portion 53 is formed on a rear portion of the first housing 52.

The first housing 52 includes a pivot shaft 54 that is formed below the latch unit connection portion 53 to extend rearward. Further, a plurality of pivot shafts 55, 56, 57, 58, and 59 are formed on a surface of the first housing 52 opposed to the second housing 75 so that an axis of each of the pivot shafts 55, 56, 57, 58, and 59 extends to the second housing 75 side. The pivot shaft 55 has a cylindrical shape with an open end surface.

As illustrated in FIG. 9 to FIG. 13, FIG. 19, and the like, a lever guide protrusion 68 protrudes to the second housing 75 side from the surface of the first housing 52 opposed to the second housing 75. As illustrated in the drawings, the lever guide protrusion 68 has a circular arc shape having a center corresponding to the axis of the pivot shaft 58.

Further, as illustrated in FIG. 9 to FIG. 13, FIG. 20, FIG. 21, and the like, a lever guide protrusion 70 protrudes to the second housing 75 side from the surface of the first housing 52 opposed to the second housing 75. As illustrated in the drawings, the lever guide protrusion 70 is located forward of the lever guide protrusion 68. Further, the lever guide protrusion 70 has a circular arc shape having a center corresponding to the axis of the pivot shaft 58 and having a diameter substantially equal to a diameter of the lever guide protrusion 68.

Still further, a spring locking portion 72, which is located in the vicinity of the pivot shaft 58, protrudes to the second housing 75 side from the surface of the first housing 52 opposed to the second housing 75.

Further, as illustrated in FIG. 9 and FIG. 11 to FIG. 14, a temporary-assembly stopper 73 (temporary stopper) protrudes to the second housing 75 side from a surface of the first housing 52 opposed to the second housing 75.

The second housing 75 is an integrally molded resin product.

A latch unit connection portion 76 is formed on a rear portion of the second housing 75.

A fitting protrusion 78 protrudes from a surface of the second housing 75 opposed to the first housing 52. Further, bearing portions 79, 80, 81, and 82 are formed on the surface of the second housing 75 opposed to the first housing 52. Each of the bearing portion 79 and the bearing portion 82 is a recessed portion formed in the second housing 75, and each of the bearing portion 80 and the bearing portion 81 has a cylindrical shape with an open end surface.

Further, a lever guide protrusion 83 protrudes to the first housing 52 side from the surface of the second housing 75 opposed to the first housing 52. As illustrated in the drawings, the lever guide protrusion 83 has a circular arc shape having a center corresponding to an axis of the bearing portion 81. As illustrated in FIG. 9, FIG. 19, FIG. 20, and FIG. 21, the lever guide protrusion 83 integrally includes a wide portion 84 and a narrow portion 85. The wide portion 84 constructs a rear portion of the lever guide protrusion 83. The narrow portion 85 constructs a front portion of the lever guide protrusion 83, and is smaller in width than the wide portion 84.

Figure 15:
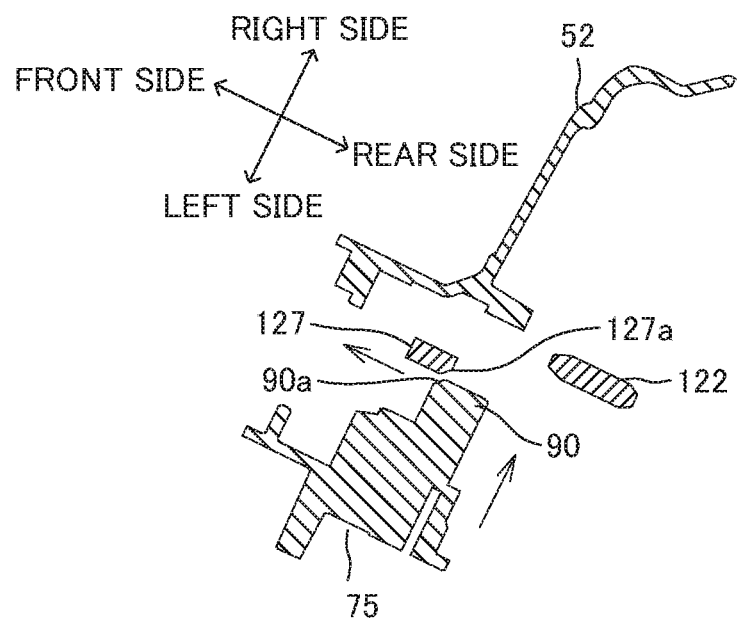
FIG. 15 is a sectional view taken along the line XV-XV of FIG. 14, for illustrating the actuator unit when the second housing is moved closer to the first housing.
Figure 16:
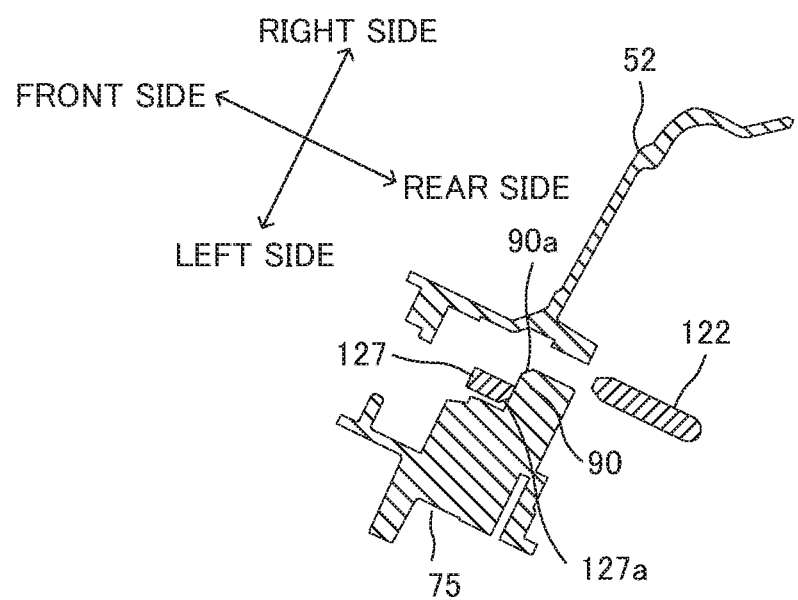
FIG. 16 is a sectional view taken along the line XV-XV of FIG. 14, for illustrating the actuator unit when the actuator unit is completed by mounting the second housing to the first housing.

Further, an end portion of the wide portion 84 on the first housing 52 side is formed of an assembly-completion stopper 90. As illustrated in FIG. 15 and FIG. 16, an inclined guide surface 90a is formed at a right front corner portion of the assembly-completion stopper 90. The inclined guide surface 90a is inclined with respect to a front surface and a right side surface of the assembly-completion stopper 90.

As illustrated in FIG. 9, FIG. 10, FIG. 17, and FIG. 18, and FIG. 20 to FIG. 29, a door switch 93 (courtesy switch or switch) being an electrical component is fixed to the surface of the first housing 52 opposed to the second housing 75.

The door switch 93 includes a main body 94 and a pressed projection 95 that projects downward from a lower end surface of the main body 94 and is pivotable relative to the main body 94. The pressed projection 95 is pivotable relative to the main body 94 about a pivot axis extending in the leftward and rightward direction. Specifically, the pressed projection 95 is pivotable between an OFF position illustrated in FIG. 9, FIG. 10, FIG. 18, FIG. 20, FIG. 22, and FIG. 23, and an ON position illustrated in FIG. 17, FIG. 21 and FIG. 24 to FIG. 29. In addition, the pressed projection 95 is urged to move to the OFF position side by urging means arranged in the main body 94.

Figure 17:
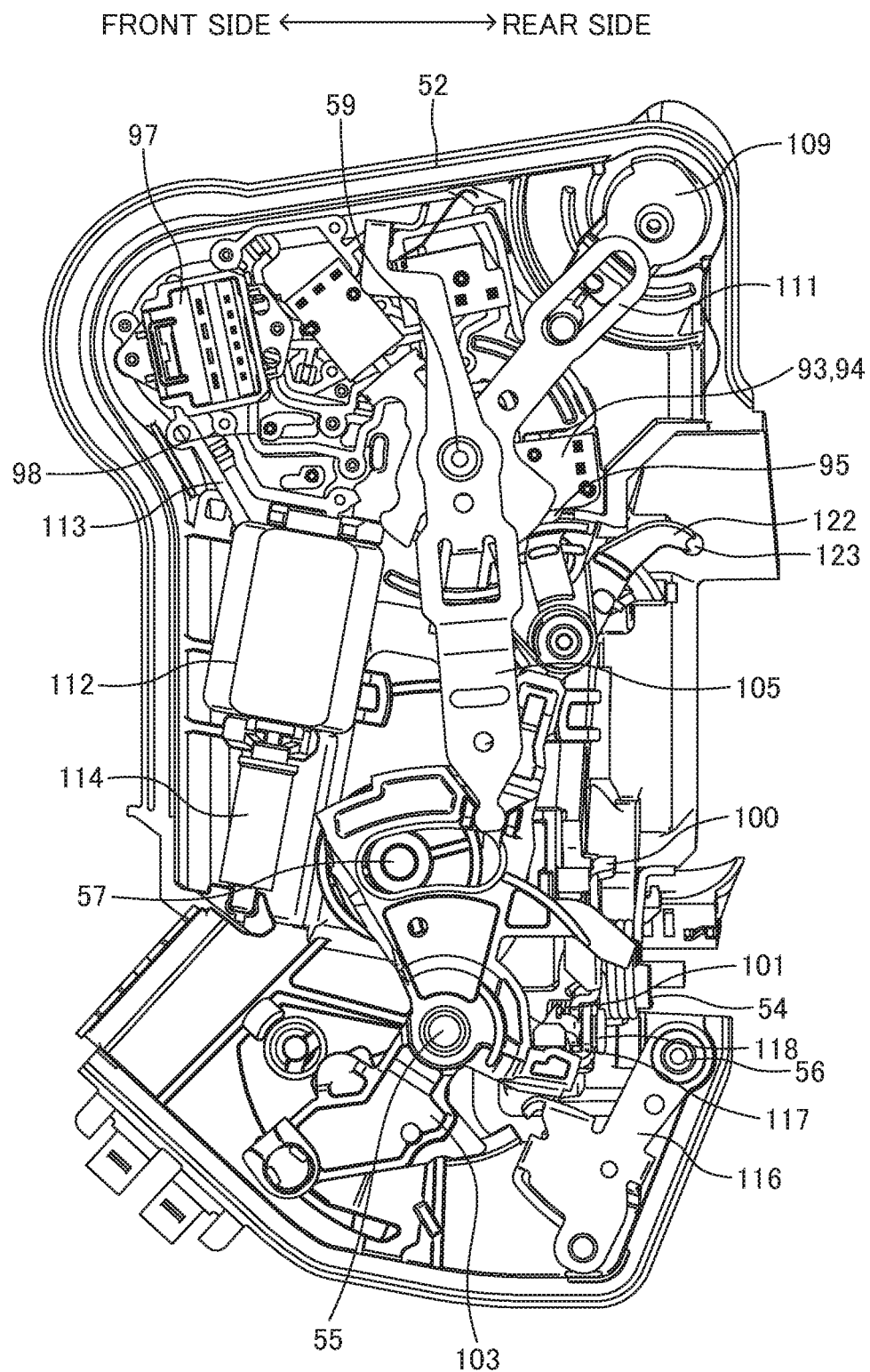
FIG. 17 is a side view for illustrating the actuator unit as seen from the vehicle inner side when the latch is positioned at the unlatched position in a case in which the door lock device is completed by mounting a latch unit (not shown) to the actuator unit under the state in which the second housing is dismounted.
Figure 18:
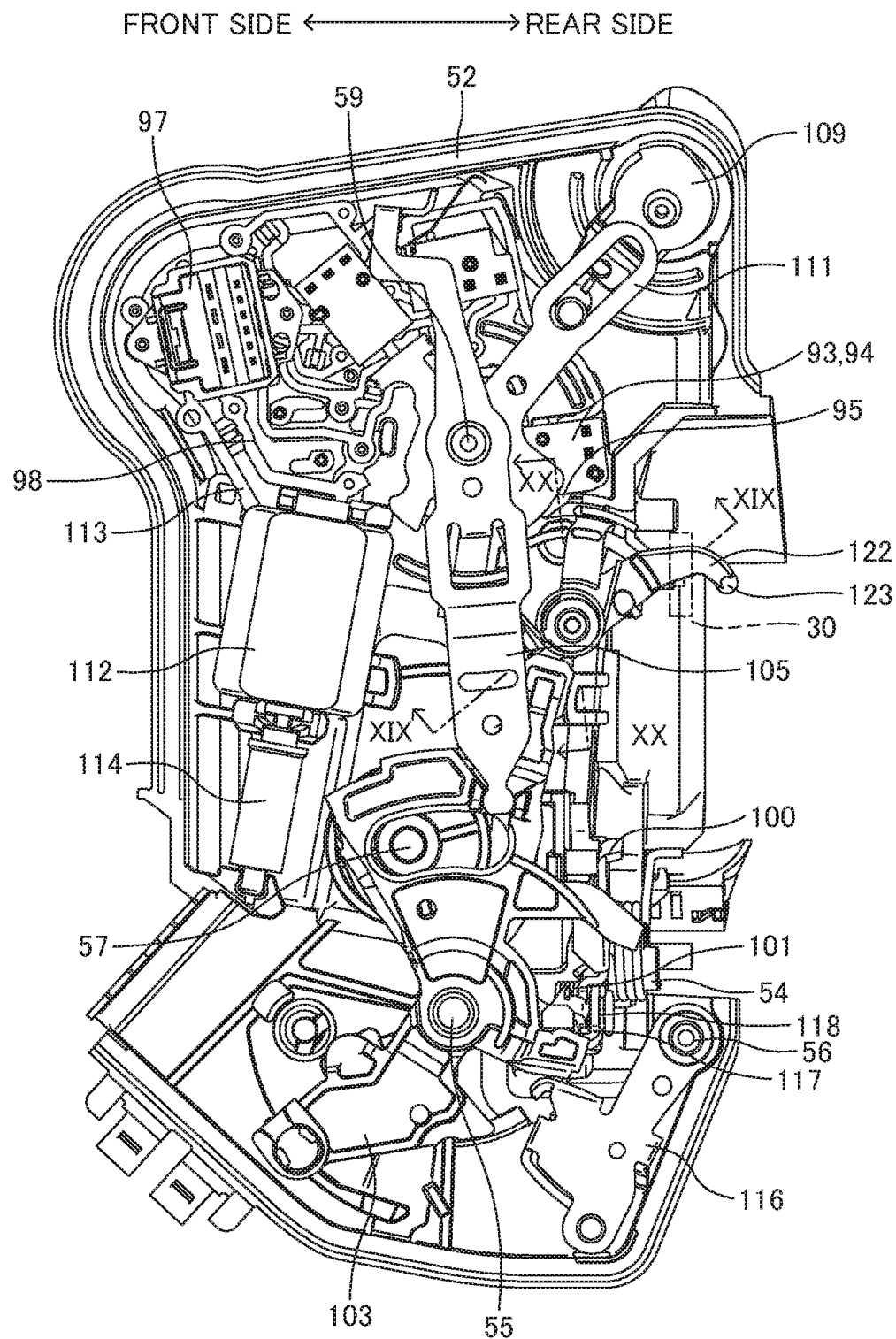
FIG. 18 is a side view, which is similar to FIG. 17, for illustrating the actuator unit when the latch is positioned at the fully-latched position.

As illustrated in FIG. 17 and FIG. 18, a connector 97 is fixed to the surface of the first housing 52 opposed to the second housing 75. A door switch terminal 98 configured to connect the door switch 93 and the connector 97 to each other is fixed to the surface of the first housing 52 opposed to the second housing 75. The connector 97 is connected to an electronic control unit (ECU) (not shown) provided in the vehicle body through a cable (not shown). In addition, the ECU is connected to a lighting device (not shown) arranged on an inner surface (for example, a ceiling surface) of the vehicle.

An open link 100 illustrated in FIG. 17 and FIG. 18 is pivotable between a locked position and an unlocked position. As described later, an outside open lever 117 is supported on (the pivot shaft 54 of) the first housing 52 so as to be pivotable, and the open link 100 is supported on a support shaft 118 so as to be pivotable. The support shaft 118 protrudes on the outside open lever 117. In addition, an urging spring 101 is arranged between the support shaft 118 and the open link 100. The urging spring 101 urges the open link 100 to pivot toward the unlocked position.

As illustrated in FIG. 17 and FIG. 18, an active lever 103 is supported on the pivot shaft 55 of the first housing 52 so as to be pivotable.

The active lever 103 is pivotable between an unlocking position (position illustrated in FIG. 17 and FIG. 18) of allowing the open link 100 to be positioned at the unlocked position, and a locking position (not shown) of holding the open link 100 at the locked position.

The active lever 103 and the lock knob 19 are linked with each other through an operation wire (not shown). When the lock knob 19 is positioned at the locked position, the active lever 103 is positioned at the locking position. As a result, the open link 100 is positioned at the locked position. Meanwhile, when the lock knob 19 is moved from the locked position to the unlocked position, the active lever 103 is caused to pivot to the unlocking position by a moving force of the lock knob 19, and the open link 100 is moved to the unlocked position. When the active lever 103 pivots to the unlocked position, the door lock device 20 is brought into a "lock releasable state". When the active lever 103 pivots to the locked position, the door lock device 20 is brought into a "lock unreleasable state".

As illustrated in FIG. 17 and FIG. 18, a locking control lever 105 is supported on the pivot shaft 59 of the first housing 52 so as to be pivotable. Further, an outside locking lever 109 arranged in the first housing 52 is linked with a key cylinder (not shown) arranged on the outer panel or the outside handle 17. In addition, a key switch lever 111 arranged in the first housing 52 links the locking control lever 105 and the outside locking lever 109 with each other.

Further, as illustrated in FIG. 17 and FIG. 18, an electric motor 112 is fixed to the surface of the first housing 52 opposed to the second housing 75. A motor terminal 113 configured to connect the electric motor 112 and the connector 97 to each other is fixed to the surface of the first housing 52 opposed to the second housing 75. The electric motor 112 is actuated through operation of a remote controller (not shown) being one of locking and unlocking operation members.

A worm gear 114 is fixed to an output shaft of the electric motor 112.

A disc-shaped wheel gear (not shown) is supported on the pivot shaft 57 of the first housing 52 so as to be pivotable. Gear teeth formed on an outer peripheral surface of the wheel gear are meshed with the worm gear 114. In addition, the wheel gear is linked with the active lever 103.

When the remote controller issues an unlocking signal (radio signal), receiving means (not shown) receives the unlocking signal, and the receiving means sends the unlocking signal to the ECU. Then, the electric motor 112 rotates in response to the signal from the ECU, and hence a rotational force of the electric motor 112 is transmitted to the wheel gear through the worm gear 114 so that the wheel gear rotates. Then, the active lever 103 linked with the wheel gear pivots to the unlocked position. Meanwhile, when the remote controller issues a locking signal (radio signal), receiving means receives the locking signal, and the receiving means sends the locking signal to the ECU. Then, the electric motor 112 rotates in response to the signal from the ECU, and the active lever 103 pivots to the locked position.

As illustrated in FIG. 17 and FIG. 18, an inside open lever 116 is supported on the pivot shaft 56 of the first housing 52 so as to be pivotable.

The inside open lever 116 and the inside handle 18 are linked with each other by the operation wire.

When the inside handle 18 is positioned at the initial position, the inside open lever 116 is positioned at an unpressing position illustrated in FIG. 17 and FIG. 18. At this time, the inside open lever 116 does not apply any force to the open link 100.

Meanwhile, when the inside handle 18 is moved from the initial position to a latch releasing position, the inside open lever 116 is moved to a pressing position (not shown). When the inside open lever 116 is moved to the pressing position in a case in which the open link 100 is positioned at the unlocked position, that is, in a case in which the door lock device 20 is in the "lock releasable state", the inside open lever 116 presses the open link 100. Thus, the open link 100 pivots in a predetermined direction. Further, in a case in which the open link 100 is positioned at the locked position, that is, in a case in which the door lock device 20 is in the "lock unreleasable state", even when the inside open lever 116 is moved to the pressing position, the inside open lever 116 does not press the open link 100.

Further, as illustrated in FIG. 17 and FIG. 18, an outside open lever 117 is supported on the pivot shaft 54 so as to be pivotable.

The outside open lever 117 is connected to the outside handle 17 through a rod.

When the outside handle 17 is positioned at the initial position, the outside open lever 117 is positioned at an unpressing position illustrated in FIG. 17 and FIG. 18. At this time, the outside open lever 117 does not apply any force to the open link 100.

Meanwhile, when the outside handle 17 is moved from the initial position to a latch releasing position, the outside open lever 117 is moved to a pressing position (not shown). When the outside open lever 117 is moved to the pressing position in the case in which the open link 100 is positioned at the unlocked position, that is, in the case in which the door lock device 20 is in the "lock releasable state", the outside open lever 117 presses the open link 100. Thus, the open link 100 pivots in the predetermined direction. Further, in the case in which the open link 100 is positioned at the locked position, that is, in the case in which the door lock device 20 is in the "lock unreleasable state", even when the outside open lever 117 is moved to the pressing position, the outside open lever 117 does not press the open link 100.

A switch lever 120 illustrated in FIG. 3 and FIG. 7 to FIG. 29 is supported on the pivot shaft 58 (lever shaft) of the first housing 52 so as to be pivotable.

The switch lever 120, which is an integrally molded resin product, includes a cylindrical boss portion 121 that is removably mounted on the pivot shaft 58 so as to be pivotable. The switch lever 120 further includes a first engagement arm 122 extending from the boss portion 121 in a radial direction of the boss portion 121.

A distal end portion of the first engagement arm 122 is formed of an arm distal end portion 123 having a substantially spherical shape. Further, a spring locking portion 125 protrudes from a left side surface of the first engagement arm 122.

As illustrated in FIG. 9, FIG. 11 to FIG. 14, FIG. 22 to FIG. 29, and the like, a second engagement arm 127 extends from a left side surface of an intermediate portion of the first engagement arm 122 in the radial direction of the boss portion 121 to be located counterclockwise (frontward) of the first engagement arm 122. That is, the second engagement arm 127 is offset leftward with respect to the first engagement arm 122. In addition, as illustrated in FIG. 15 and FIG. 16, a cross-sectional shape of the second engagement arm 127 is substantially rectangular. Further, an inclined guide surface 127a is formed at a left rear corner portion of the second engagement arm 127. The inclined guide surface 127a is inclined with respect to a rear surface and a left side surface of the second engagement arm 127. Still further, a switch pressing piece 128 is fixed to a distal end portion of the second engagement arm 127. The switch pressing piece 128 has a circular arc shape having a center corresponding to the axis of the boss portion 121.

Further, a support projecting portion 129a protrudes from a right end portion of the boss portion 121. Still further, a proximal end portion (one end portion) of an elastic deformation piece 129b located on an outer peripheral side of the boss portion 121 is fixed to a distal end portion of the support projecting portion 129a. That is, the elastic deformation piece 129b is supported in a cantilevered state by the support projecting portion 129a. Accordingly, the elastic deformation piece 129b can bend about the proximal end portion thereof. In other words, the elastic deformation piece 129b is elastically deformable in the radial direction of the boss portion 121.

As illustrated in FIG. 9 to FIG. 14, FIG. 22 to FIG. 29, and the like, a lever spring 130 (urging means) being a torsion coil spring is removably mounted to the boss portion 121 of the switch lever 120.

The lever spring 130 includes a coil-shaped main body 131, and a first locking piece 132 and a second locking piece 133 extending from both ends of the main body 131, respectively. The lever spring 130 is mounted to the switch lever 120 so that the main body 131 is located on the outer peripheral side of the boss portion 121. Therefore, the lever spring 130 is pivotable about the main body 131 relative to the boss portion 121. Further, when the main body 131 is mounted to the boss portion 121, the spring locking portion 125 is located on a pivoting path of the first locking piece 132 about the main body 131.

The switch lever 120 and the lever spring 130 integrated with each other are temporarily assembled to the first housing 52 through the following procedures.

Figure 11:
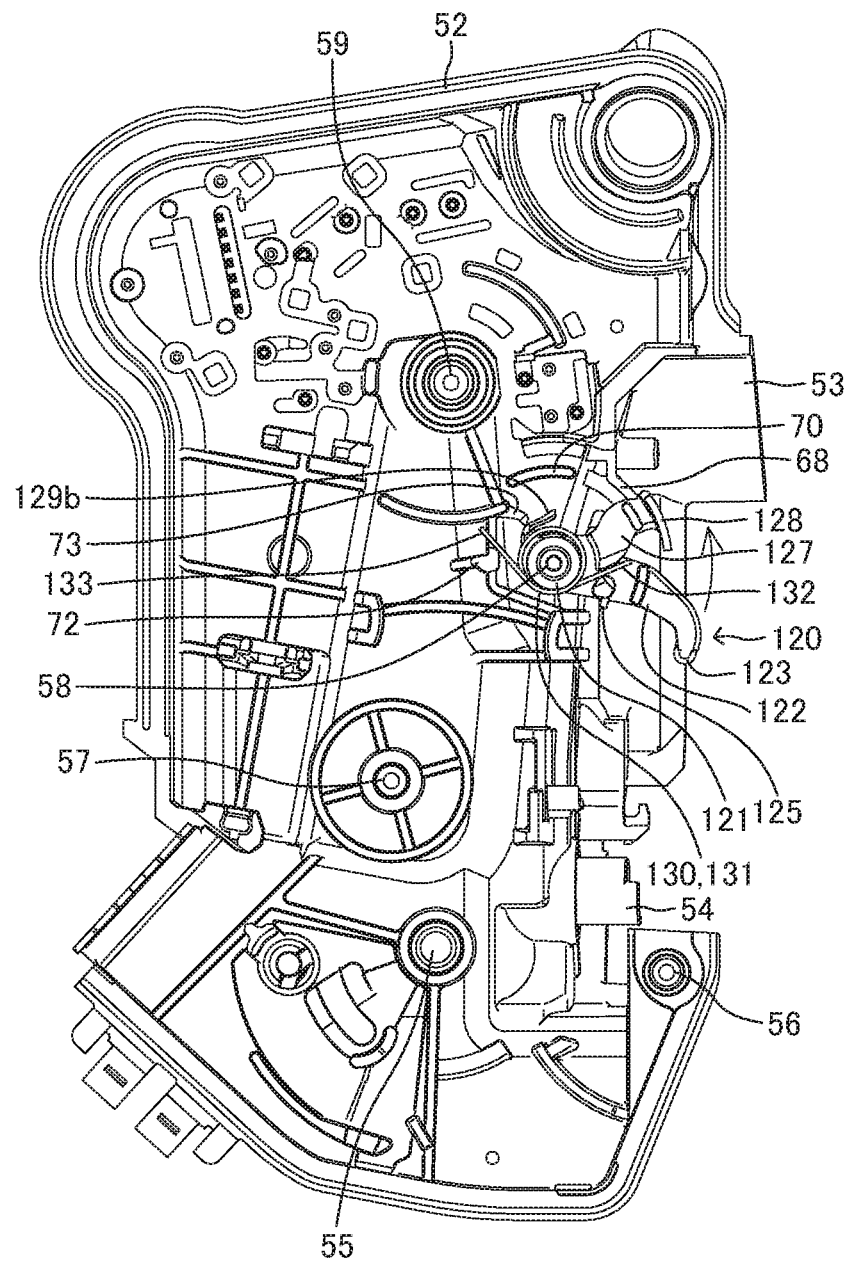
FIG. 11 is a side view for illustrating the actuator unit as seen from the vehicle inner side when a switch lever mounted to a pivot shaft of a first housing so as to be pivotable is positioned at an outside position under a state in which the second housing is dismounted.

First, as illustrated in FIG. 11, a worker (not shown) mounts the boss portion 121 to the pivot shaft 58 while holding the switch lever 120 by hand. At this time, a pivoting position of the switch lever 120 relative to the pivot shaft 58 is adjusted so that the proximal end portion (front end portion) of the elastic deformation piece 129b of the switch lever 120 is positioned directly below a rear end portion of the temporary-assembly stopper 73 and a portion of the elastic deformation piece 129b excluding the proximal end portion is positioned rearward of the temporary-assembly stopper 73. The pivoting position of the switch lever 120 relative to the pivot shaft 58 at this time is referred to as "outside position".

Further, the first locking piece 132 of the lever spring 130 is brought into contact with the spring locking portion 125 from the front side, and the second locking piece 133 is brought into contact with the spring locking portion 72 from the rear side. At this time, the lever spring 130 is in a free state. Therefore, the lever spring 130 at this time does not generate an urging force.

Figure 12:
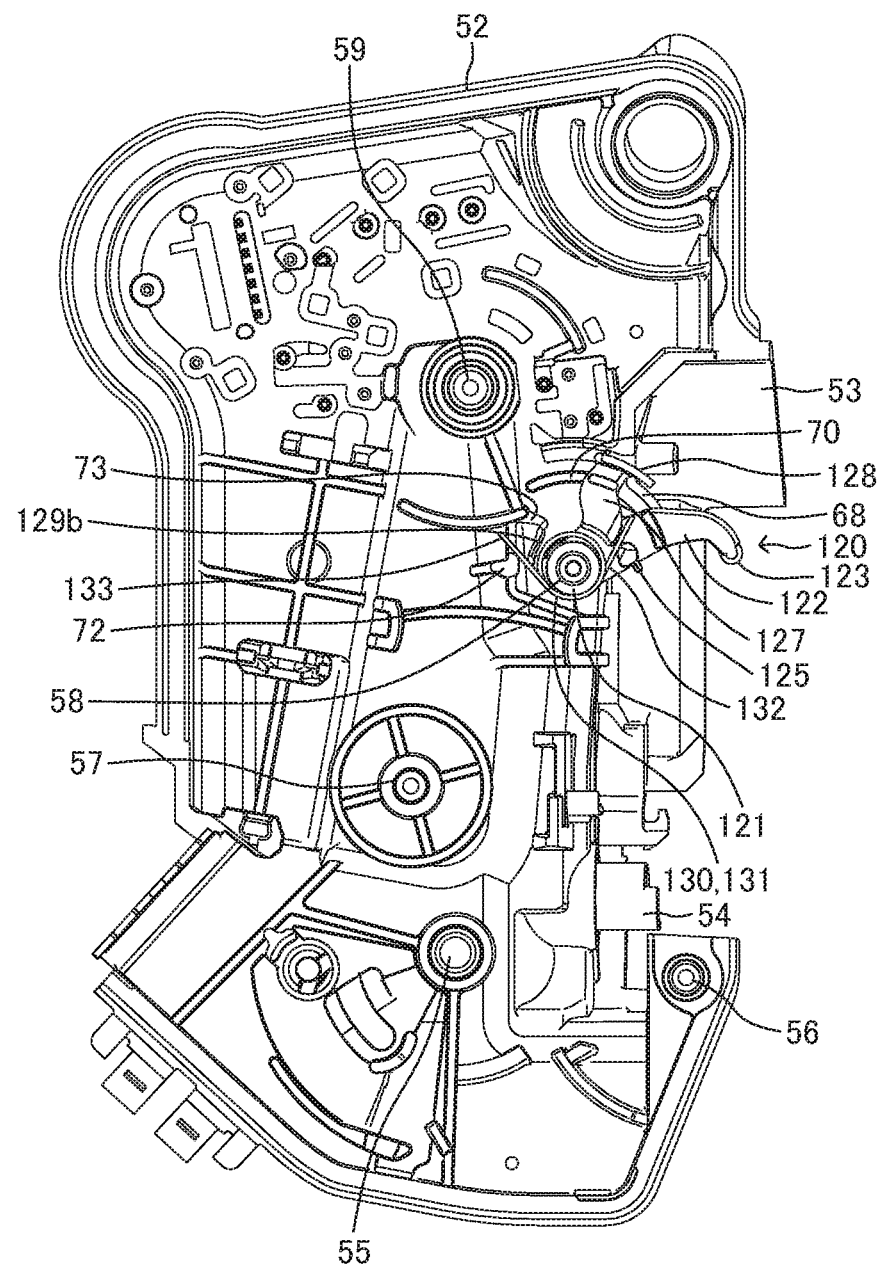
FIG. 12 is a side view, which is similar to FIG. 11, for illustrating the actuator unit when the switch lever has pivoted from the outside position to an in-operation pivoting range.
Figure 13:
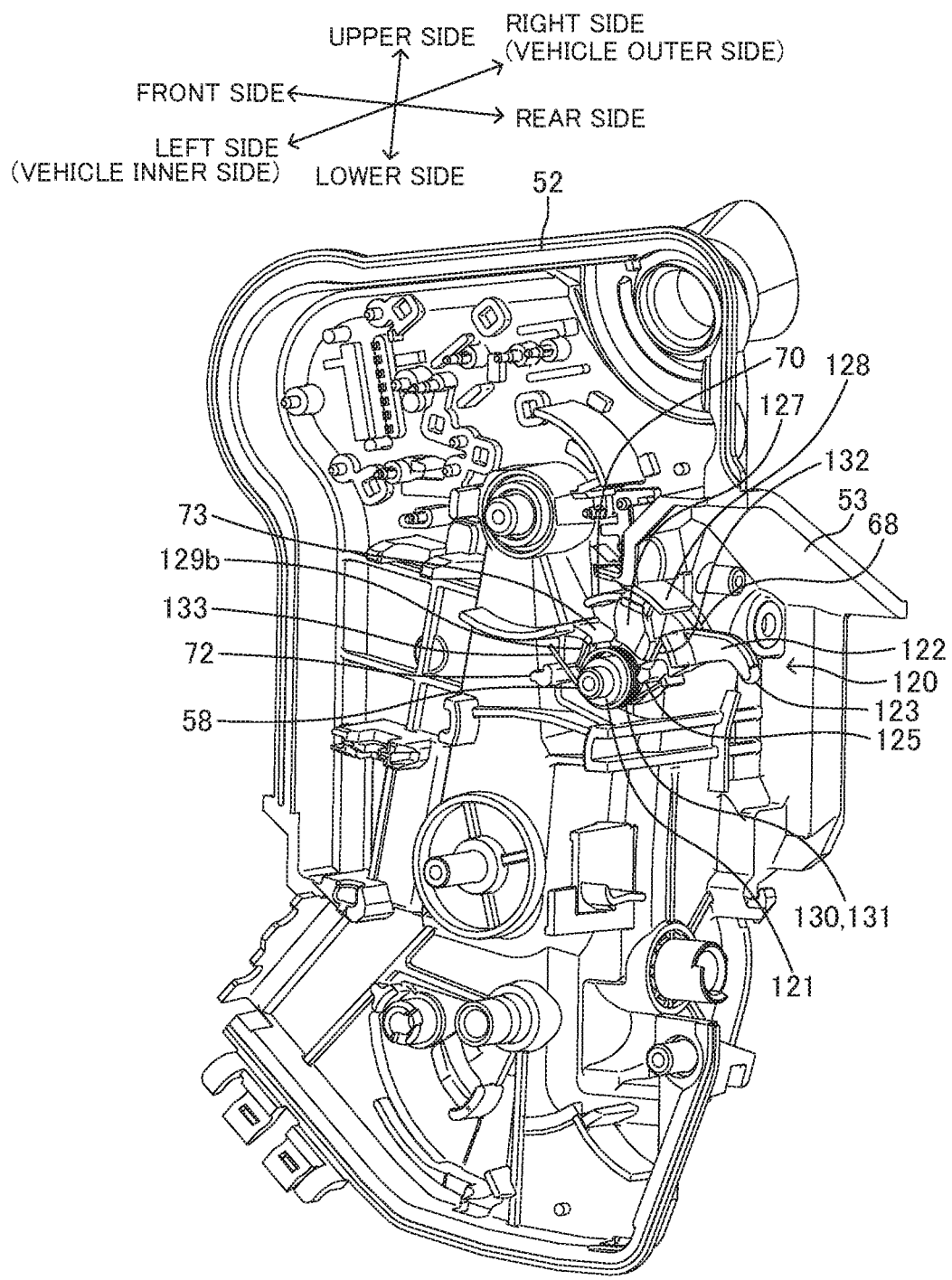
FIG. 13 is a perspective view for illustrating the actuator unit as seen from the vehicle inner side when the switch lever is positioned within the in-operation pivoting range under the state in which the second housing is dismounted.

Under this state, the worker causes, by hand, the switch lever 120 to pivot in the counterclockwise direction in FIG. 11. Then, the elastic deformation piece 129b climbs over the temporary-assembly stopper 73 while being elastically deformed or bent to the boss portion 121 side. As a result, the switch lever 120 pivots to a position illustrated in FIG. 12. The pivoting position (range) of the switch lever 120 relative to the pivot shaft 58, which ranges from the position of the switch lever 120 illustrated in FIG. 12 to a position of the switch lever 120 having pivoted from this position in the counterclockwise direction in FIG. 12, is referred to as "in-operation pivoting range". An end position of the in-operation pivoting range in the counterclockwise direction corresponds to a position when the switch lever 120 pivots to a position illustrated in FIG. 28 and FIG. 29, which is described later.

Accordingly, the spring locking portion 125 is moved counterclockwise about the pivot shaft 58 from the position illustrated in FIG. 11. Therefore, the spring locking portion 125 is brought close to the spring locking portion 72 while pressing the first locking piece 132 frontward. Thus, the lever spring 130 is elastically deformed in the state illustrated in FIG. 12 to generate the urging force for causing the switch lever 120 (spring locking portion 125) to pivot in the clockwise direction in FIG. 12.

Accordingly, when no external force other than the urging force of the lever spring 130 for causing the switch lever 120 to pivot is exerted on the switch lever 120, the switch lever 120 tends to pivot relative to the pivot shaft 58 in the clockwise direction in FIG. 12. However, as illustrated in FIG. 12, when the distal end portion of the elastic deformation piece 129b is brought into contact with the temporary-assembly stopper 73 from behind (from below), the temporary-assembly stopper 73 and the elastic deformation piece 129b prevent the switch lever 120 from further pivoting clockwise. In other words, the temporary-assembly stopper 73 and the elastic deformation piece 129b prevent the switch lever 120 from pivoting to the outside position side from the in-operation pivoting range.

Figure 19:
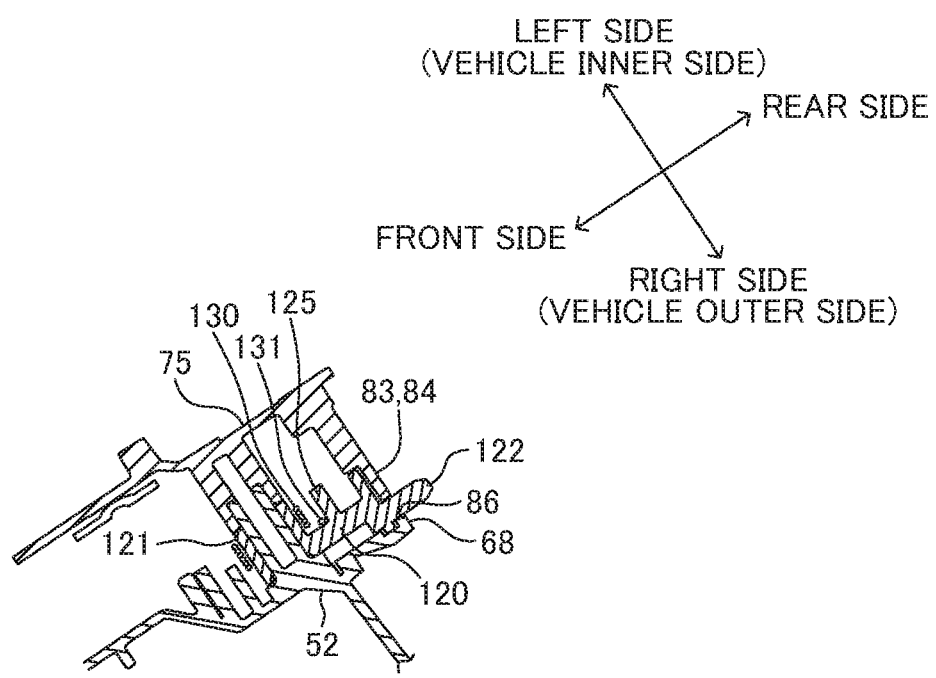
FIG. 19 is a sectional view taken along the line XIX-XIX of FIG. 18.
Figure 20:
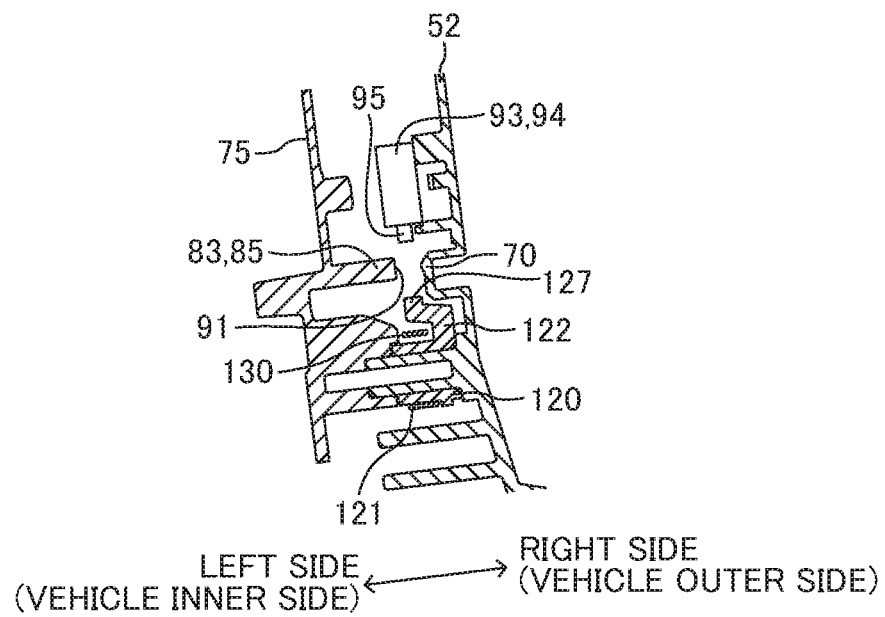
FIG. 20 is a sectional view taken along the line XX-XX of FIG. 18.
Figure 21:
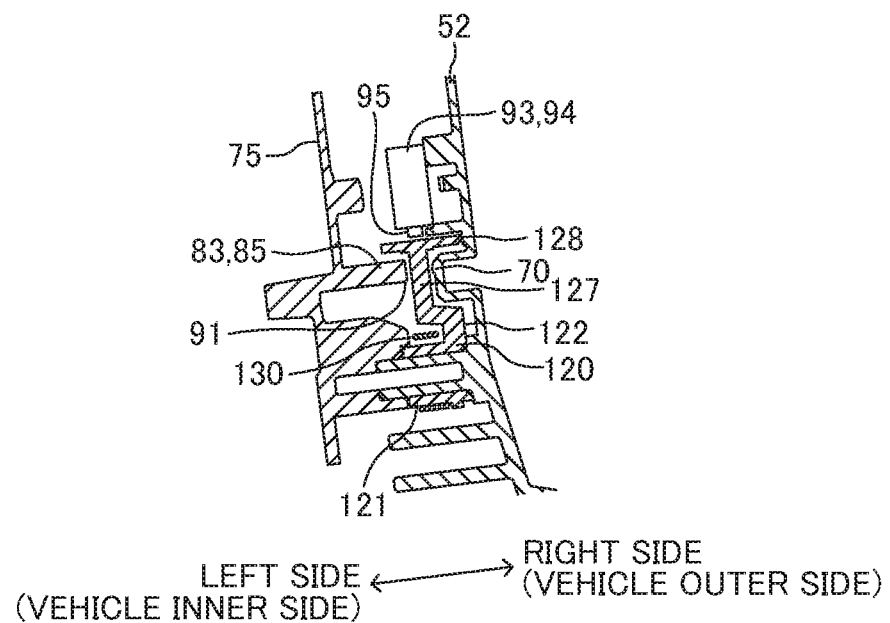
FIG. 21 is a sectional view, which is similar to FIG. 20, for illustrating the actuator unit when the latch is positioned at the unlatched position.

When the switch lever 120 and the lever spring 130 are mounted to the first housing 52 in this manner, as illustrated in FIG. 19 to FIG. 21, the first engagement arm 122 is located leftward of the lever guide protrusion 68, and the second engagement arm 127 is located leftward of the lever guide protrusion 70.

The first housing 52 and the second housing 75 are fixed to each other by fixing means under a state in which opposed portions of outer peripheral edges of the first housing 52 and the second housing 75 are held in contact with each other. Thus, the actuator unit 50 is completed.

When the actuator unit 50 is completed, the fitting protrusion 78 of the second housing 75 is fitted to the pivot shaft 55 of the first housing 52, and the pivot shafts 56, 57, 58, and 59 of the first housing 52 are fitted to the bearing portions 79, 80, 81, and 82 of the second housing 75, respectively.

Further, as illustrated in FIG. 19, the lever guide protrusion 68 of the first housing 52 and the wide portion 84 of the lever guide protrusion 83 of the second housing 75 are opposed to each other with a switch lever movement allowing groove 86 (gap) formed therebetween. The first engagement arm 122 of the switch lever 120 is positioned in the switch lever movement allowing groove 86 so as to be pivotable.

Still further, as illustrated in FIG. 20 and FIG. 21, the second engagement arm 127 of the switch lever 120 is positioned on the right side of the narrow portion 85 of the lever guide protrusion 83 and directly in front of the wide portion 84. That is, the second engagement arm 127 of the switch lever 120 is positioned in a switch lever movement allowing groove 91 (gap) defined between the lever guide protrusion 70 of the first housing 52 and the lever guide protrusion 83 (narrow portion 85) of the second housing 75. A rear end portion of the switch lever movement allowing groove 91 communicates with a front end portion of the switch lever movement allowing groove 86.

Still further, as illustrated in FIG. 11 to FIG. 14 and FIG. 21, the switch pressing piece 128 of the switch lever 120 is positioned on the outer peripheral side of the lever guide protrusion 68, the lever guide protrusion 70, and the lever guide protrusion 83.

Figure 7:
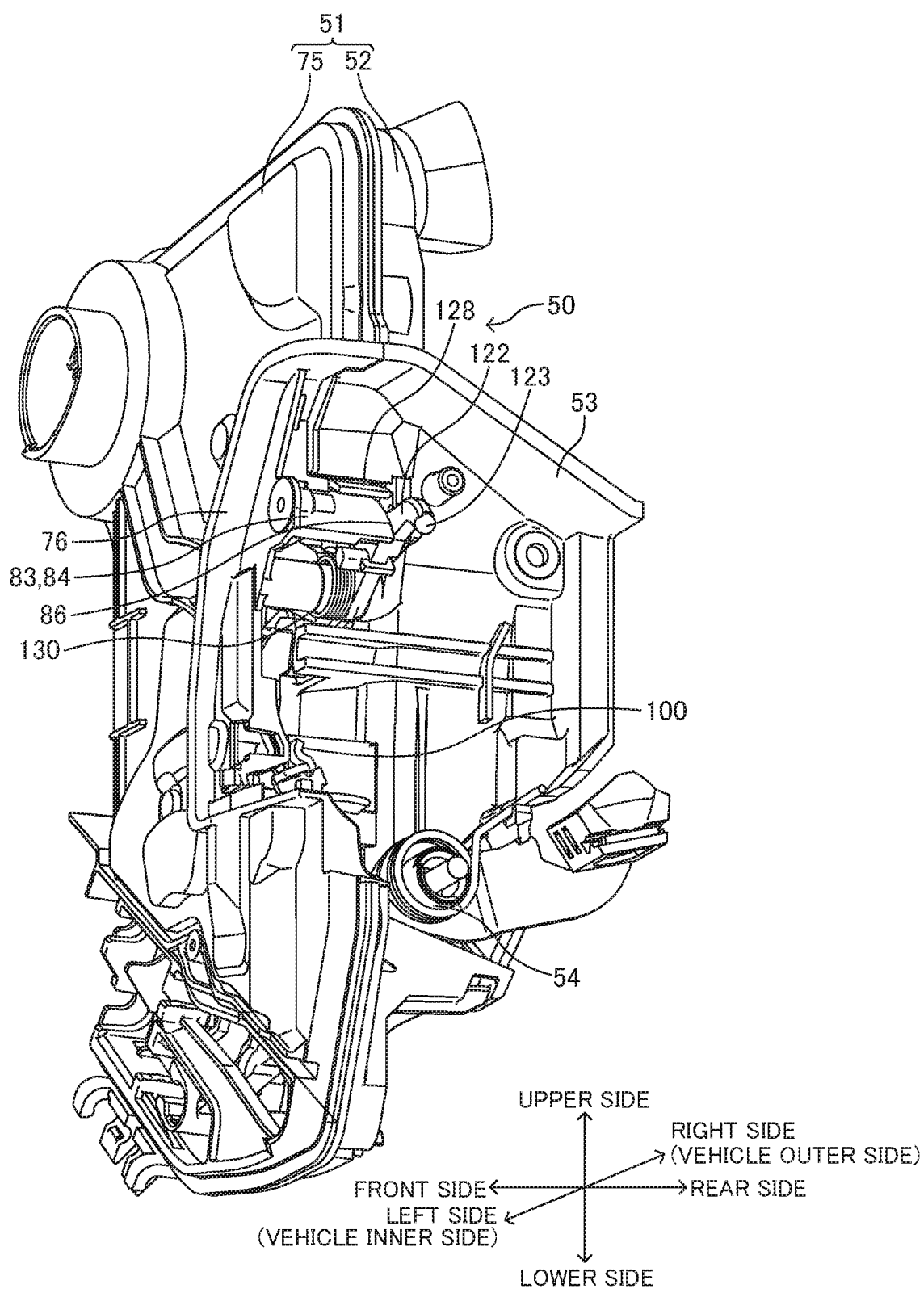
FIG. 7 is a perspective view for illustrating the actuator unit as seen from the rear side on the vehicle inner side.
Figure 8:
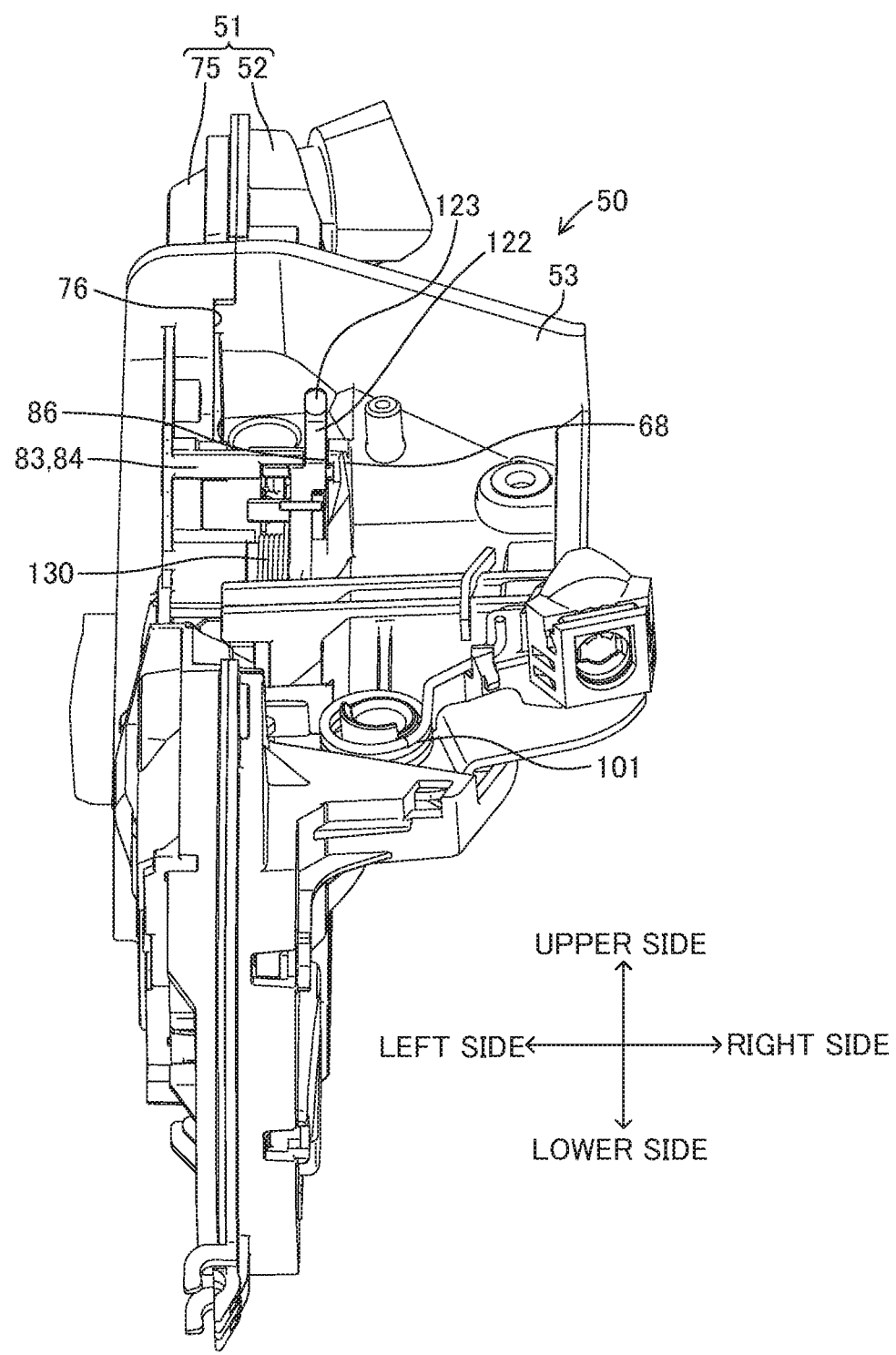
FIG. 8 is a rear bottom perspective view for illustrating the actuator unit.
Figure 9:
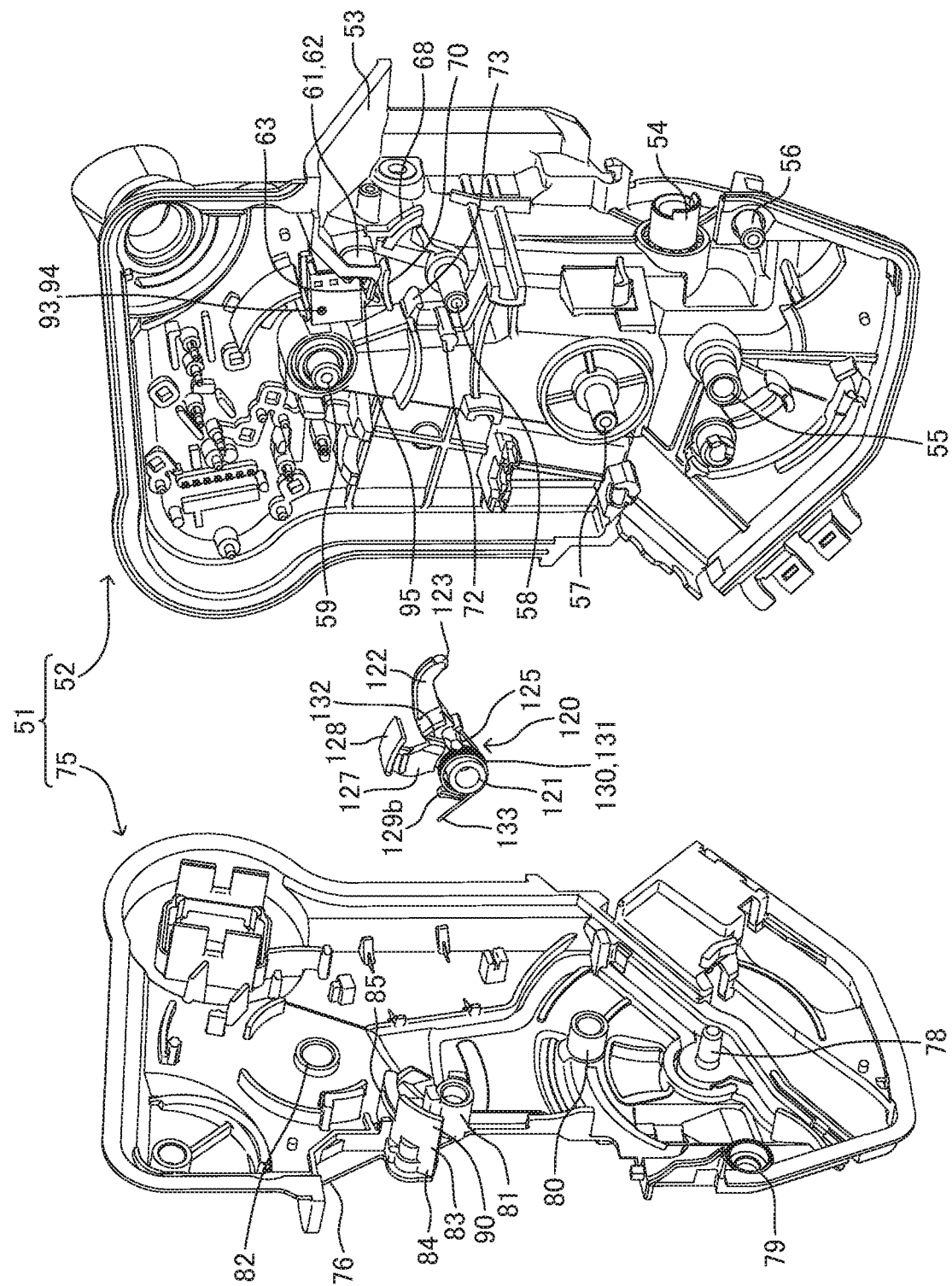
FIG. 9 is an exploded perspective view for illustrating the actuator unit.
Figure 10:
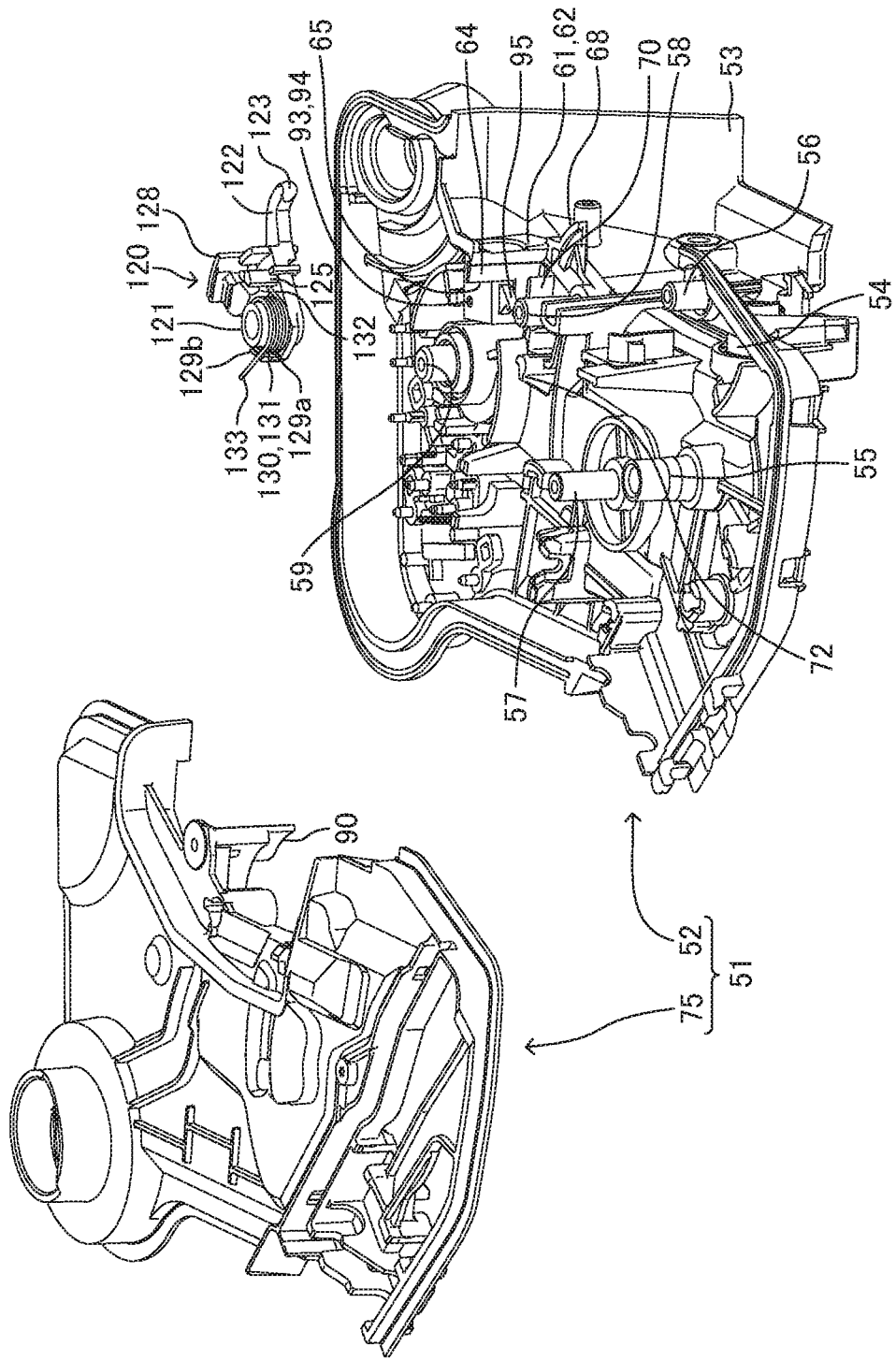
FIG. 10 is an exploded perspective view for illustrating the actuator unit as seen from a direction different from the direction of FIG. 9.

Still further, when the actuator unit 50 is completed, the rear surface of the actuator housing 51 has an opening portion surrounded by the latch unit connection portion 53 of the first housing 52 and the latch unit connection portion 76 of the second housing 75 (see FIG. 3 and FIG. 7). Further, the distal end portion (arm distal end portion 123) of the first engagement arm 122 of the switch lever 120 is positioned in the opening portion.

Further, when the opposed portions of the outer peripheral edges of the first housing 52 and the second housing 75 are brought close to each other during assembly of the actuator unit 50, as illustrated in FIG. 15, the inclined guide surface 90a of the assembly-completion stopper 90 of the second housing 75 is brought close to the inclined guide surface 127a of the second engagement arm 127 from the left side.

Figure 14:
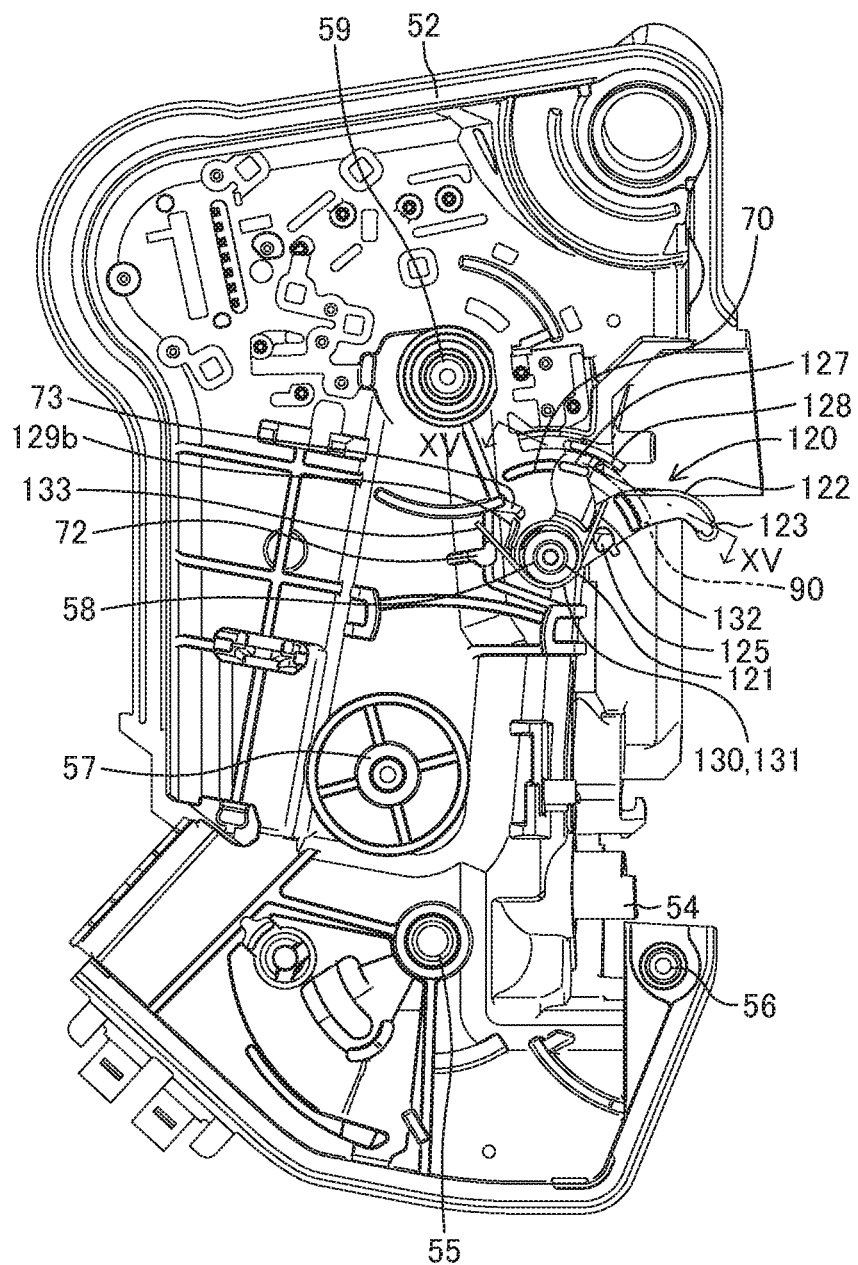
FIG. 14 is a side view, which is similar to FIG. 11, for illustrating the actuator unit when the actuator unit is completed by mounting the second housing to the first housing.

When the outer peripheral edge of the first housing 52 is further brought close to the outer peripheral edge of the second housing 75 from the state illustrated in FIG. 15, the inclined guide surface 127a of the second engagement arm 127 is pressed by the inclined guide surface 90a of the assembly-completion stopper 90 to the front side (in the counterclockwise direction in FIG. 11 to FIG. 14). Further, when the second engagement arm 127 pressed to the front side is positioned directly in front of the assembly-completion stopper 90 (not shown), a rear surface of the second engagement arm 127, which is urged to pivot to the rear side (in the clockwise direction in FIG. 11 to FIG. 14) by the urging force generated by the lever spring 130, is brought into contact with a front surface of the assembly-completion stopper 90, and the rear surface of the second engagement arm 127 is further pressed to the front side by the front surface of the assembly-completion stopper 90. Accordingly, as illustrated in FIG. 14, the elastic deformation piece 129b and the temporary-assembly stopper 73, which have been held in contact with each other, are separated from each other.

When the opposed portions of the outer peripheral edges of the first housing 52 and the second housing 75 are brought into contact with each other, that is, the actuator unit 50 is completed, as illustrated in FIG. 14 and FIG. 16, the rear surface of the second engagement arm 127, which is urged to pivot to the rear side by the urging force generated by the lever spring 130, is brought into contact with the front surface of the assembly-completion stopper 90. That is, the assembly-completion stopper 90 prevents the second engagement arm 127 from pivoting clockwise.

Further, the assembly-completion stopper 90 prevents the second engagement arm 127 from pivoting clockwise, and hence the switch lever 120 is prevented from pivoting from the in-operation pivoting range to the outside position side. That is, the elastic deformation piece 129b and the temporary-assembly stopper 73 are prevented from being brought into contact with each other again.

The latch unit 25 is mounted into the opening portion enclosed by the latch unit connection portion 53 of the first housing 52 and the latch unit connection portion 76 of the second housing 75, and the latch unit 25 and the actuator unit 50 are fixed to each other. Thus, the door lock device 20 is completed as illustrated in FIG. 2.

When the door lock device 20 is completed, in the opening portion surrounded by the latch unit connection portion 53 of the first housing 52 and the latch unit connection portion 76 of the second housing 75, a distal end portion (upper end portion) of the open link 100 of the actuator unit 50 is opposed to the lift lever 48 of the latch unit 25 (not shown).

Further, as illustrated in FIG. 18, the distal end portion of the first engagement arm 122 of the switch lever 120 passes through the through-hole 30 of the latch unit 25 (see the two-dot chain line). Although not shown, the arm distal end portion 123 is brought into contact with the latch 40 in the latch unit 25. Then, the switch lever 120 receives a reaction force from the latch 40, and thus slightly pivots against the urging force of the lever spring 130 in the counterclockwise direction in FIG. 11 to FIG. 14, FIG. 17, and FIG. 18 (that is, to a side opposite to the outside position). As a result, the second engagement arm 127 pivots counterclockwise from a position of being held in abutment against the assembly-completion stopper 90, and hence the second engagement arm 127 is separated from the assembly-completion stopper 90 in the counterclockwise direction. That is, in a completed state of the door lock device 20, the second engagement arm 127 and the assembly-completion stopper 90 are always separated from each other.

Figure 22:
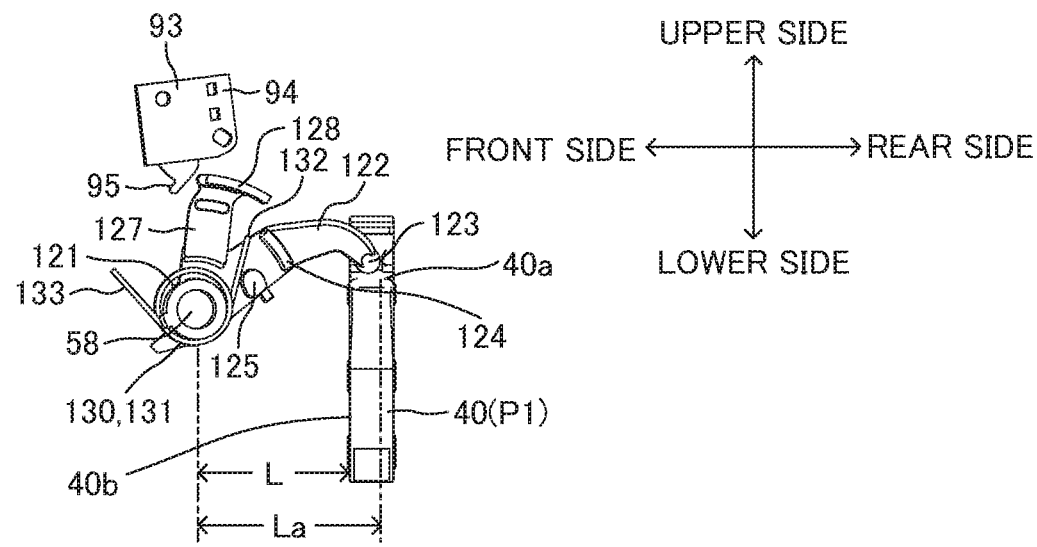
FIG. 22 is a side view for illustrating the latch, a door switch, and the switch lever as seen from the vehicle inner side when the latch is positioned at the fully-latched position.
Figure 23:
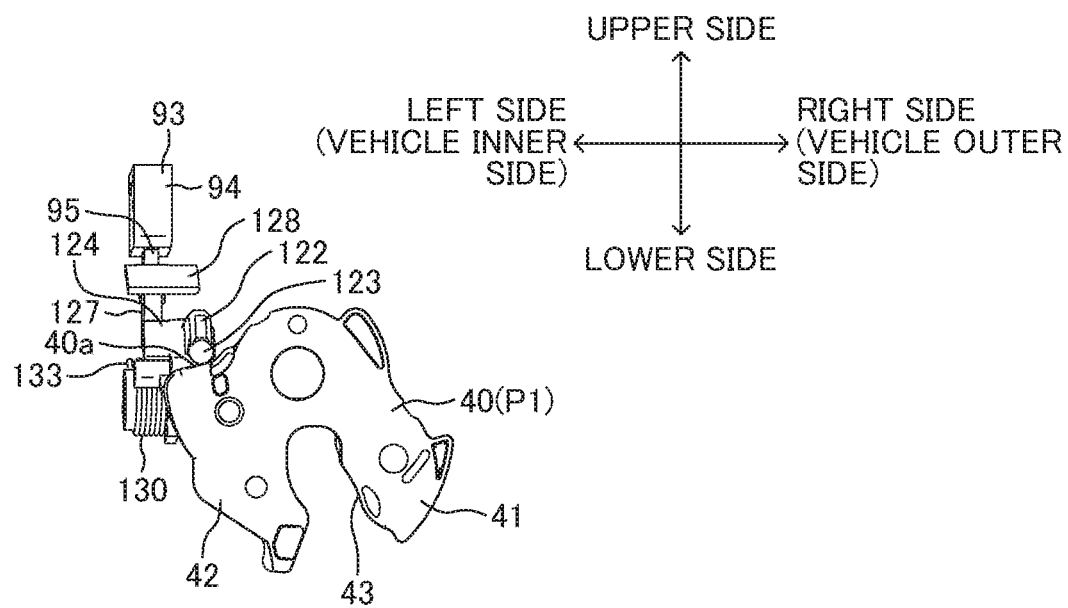
FIG. 23 is a back view for illustrating the latch, the door switch, and the switch lever of FIG. 22.

When the latch 40 is positioned at a fully-latched position P1 illustrated in FIG. 22 and FIG. 23 and the pole 45 is positioned at the engaged position, the latch 40 is positioned to the fully-latched position P1 through engagement with the pole 45. Thus, when the vehicle door 10 is positioned at the closed position, the vehicle door 10 is held at the closed position.

Further, La represents a horizontal distance of the first engagement arm 122 of the switch lever 120 in the frontward and rearward direction (distance from the pivot shaft 58 to the arm distal end portion 123 in the frontward and rearward direction on a horizontal plane) when the latch 40 is positioned at the fully-latched position P1. The horizontal distance La is larger than a distance L in the frontward and rearward direction between the pivot shaft 58 and the second engagement surface 40b that is a side surface (front surface of the latch 40) of both side surfaces of the latch 40, which is opposed to the switch lever 120. Therefore, the arm distal end portion 123 of the switch lever 120 is brought into abutment against the first engagement surface 40a of the latch 40 from above by the elastic urging force of the lever spring 130. Further, the switch pressing piece 128 of the second engagement arm 127 of the switch lever 120 is separated from the pressed projection 95 of the door switch 93 to the rear side. Therefore, the switch pressing piece 128 does not press the pressed projection 95 of the door switch 93 from the OFF position to the ON position. Accordingly, when the latch 40 is positioned at the fully-latched position P1, an actuation state of the door switch 93 is an OFF state.

The open link 100 is positioned at the unlocked position by, for example, positioning the lock knob 19 at the unlocked position under the state illustrated in FIG. 22 and FIG. 23. Under this state, when the outside handle 17 or the inside handle 18 is moved from the initial position to the latch releasing position, the inside open lever 116 or the outside open lever 117 is moved from the unpressing position to the pressing position, and the inside open lever 116 or the outside open lever 117 presses the open link 100 in the above-mentioned predetermined direction. Then, the open link 100 is moved closer to the lift lever 48 side to cause the lift lever 48 to pivot, and thus the pole 45 positioned at the engaged position is moved to the disengaged position. As a result, the pole 45 and the latch 40 are disengaged from each other so that the latch 40 is pivotable to the unlatched position.

Figure 24:
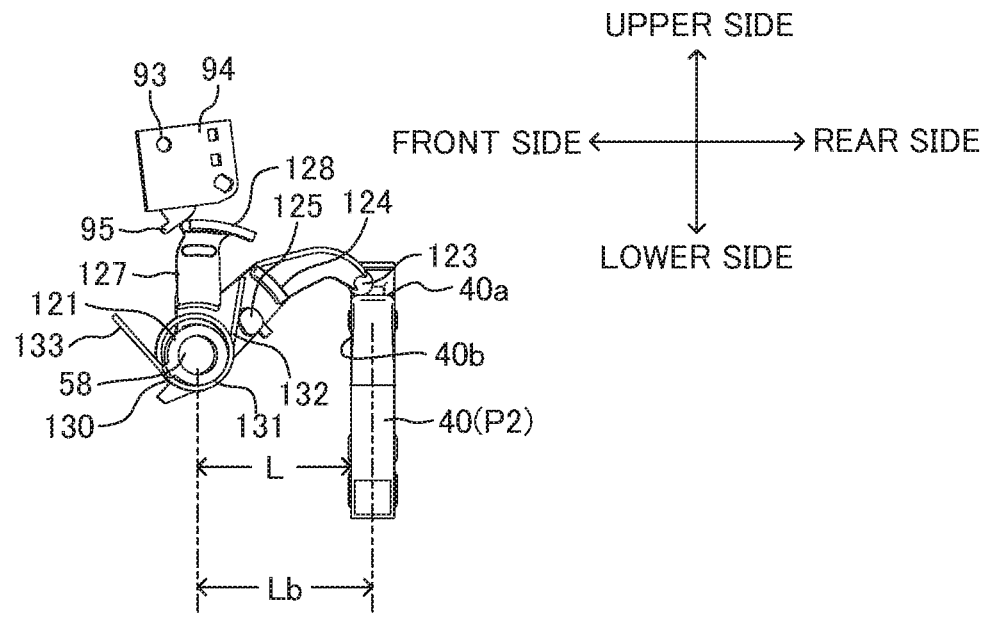
FIG. 24 is a side view, which is similar to FIG. 22, for illustrating the latch, the door switch, and the switch lever when the latch is positioned at a switching position.
Figure 25:
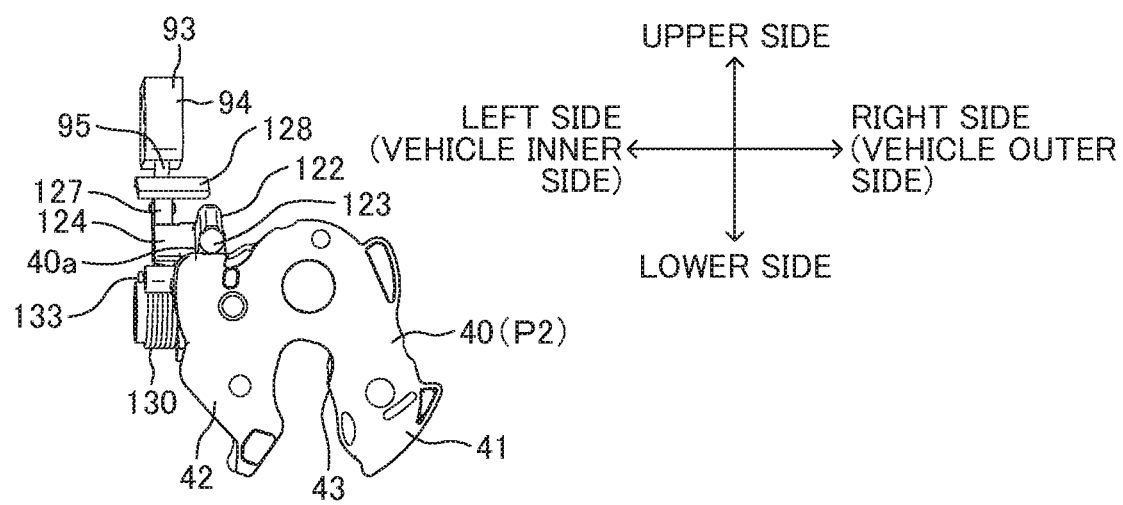
FIG. 25 is a back view, which is similar to FIG. 23, for illustrating the latch, the door switch, and the switch lever when the latch is positioned at the switching position.
Figure 28:
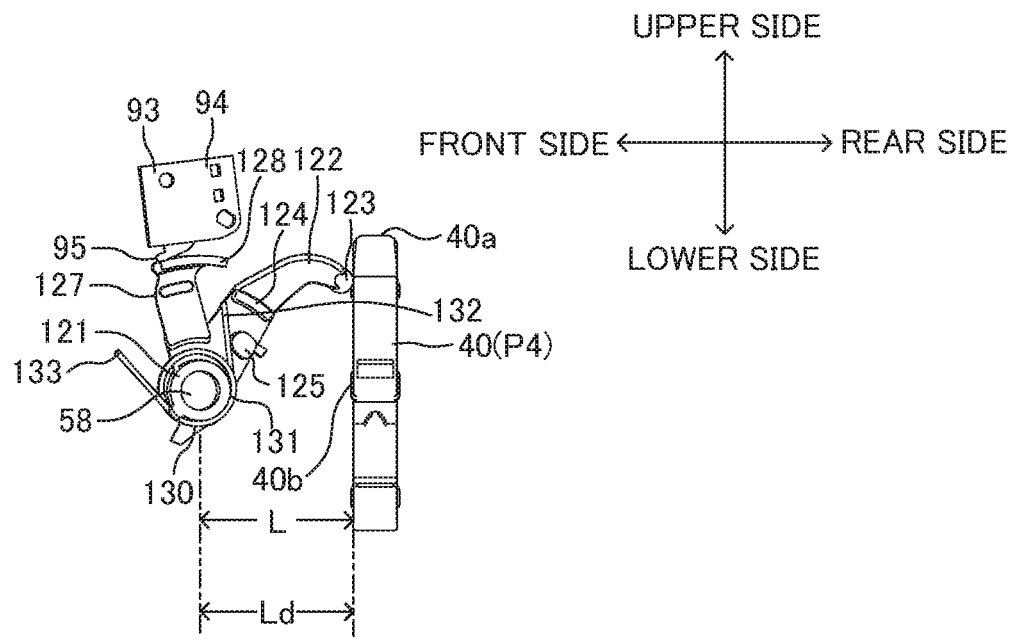
FIG. 28 is a side view, which is similar to FIG. 22, for illustrating the latch, the door switch, and the switch lever when the latch is positioned at the unlatched position.
Figure 29:
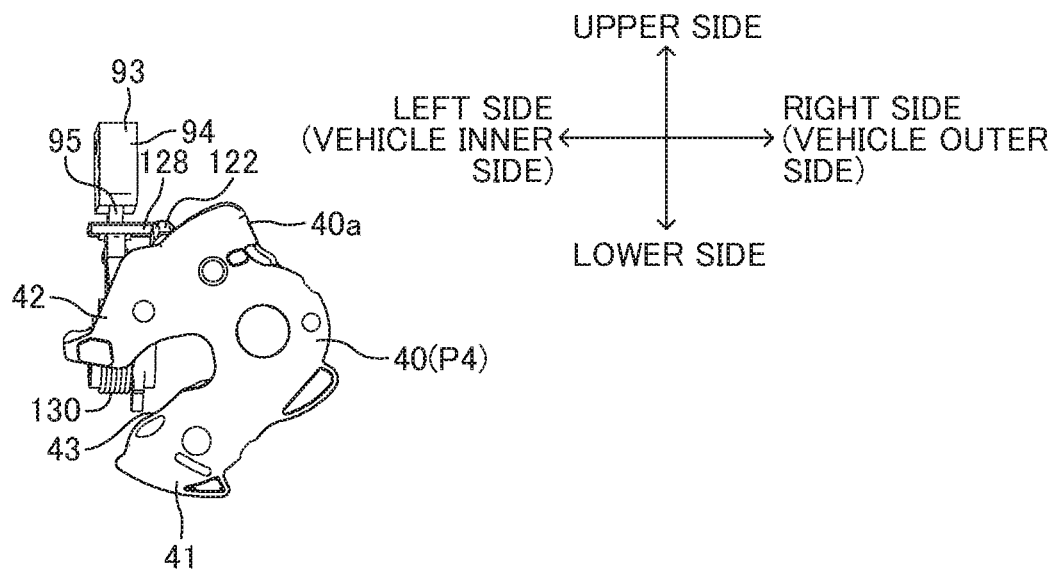
FIG. 29 is a back view, which is similar to FIG. 23, for illustrating the latch, the door switch, and the switch lever when the latch is positioned at the unlatched position.

Accordingly, under this state, when the vehicle door 10 positioned at the closed position is opened, the latch 40 pivots from the fully-latched position P1 toward an unlatched position P4 (see FIG. 28 and FIG. 29). At this time, the arm distal end portion 123 of the first engagement arm 122 is pushed upward by the first engagement surface 40a of the latch 40, and thus the switch lever 120 pivots about the pivot shaft 58 in the counterclockwise direction in FIG. 22 and FIG. 24 against the elastic urging force of the lever spring 130. As illustrated in FIG. 24 and FIG. 25, when the latch 40 pivots to a switching position (switch ON position) P2 halfway to the unlatched position P4, the switch pressing piece 128 of the switch lever 120 presses the pressed projection 95 of the door switch 93, which has been positioned at the OFF position, to the ON position so that the actuation state of the door switch 93 is switched to an ON state. As a result, the lighting device connected to the ECU turns on.

At this time, a horizontal distance Lb of the switch lever 120 is smaller than the horizontal distance La, but larger than the distance L. Therefore, the arm distal end portion 123 of the first engagement arm 122 slides frontward on the first engagement surface 40a of the latch 40.

Figure 26:
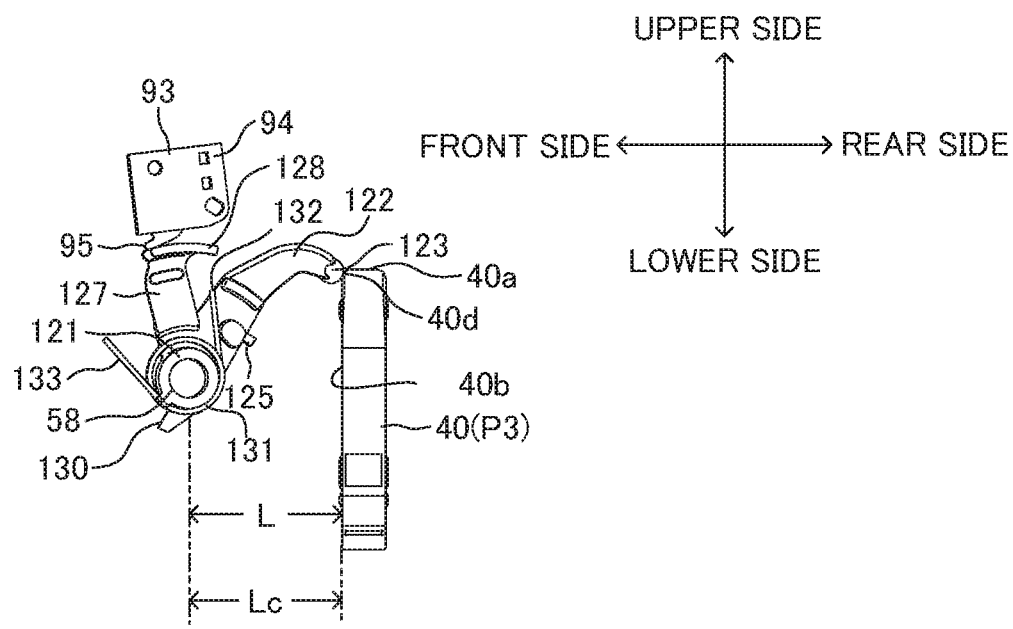
FIG. 26 is a side view, which is similar to FIG. 22, for illustrating the latch, the door switch, and the switch lever when the latch is positioned at a half-latched position.
Figure 27:
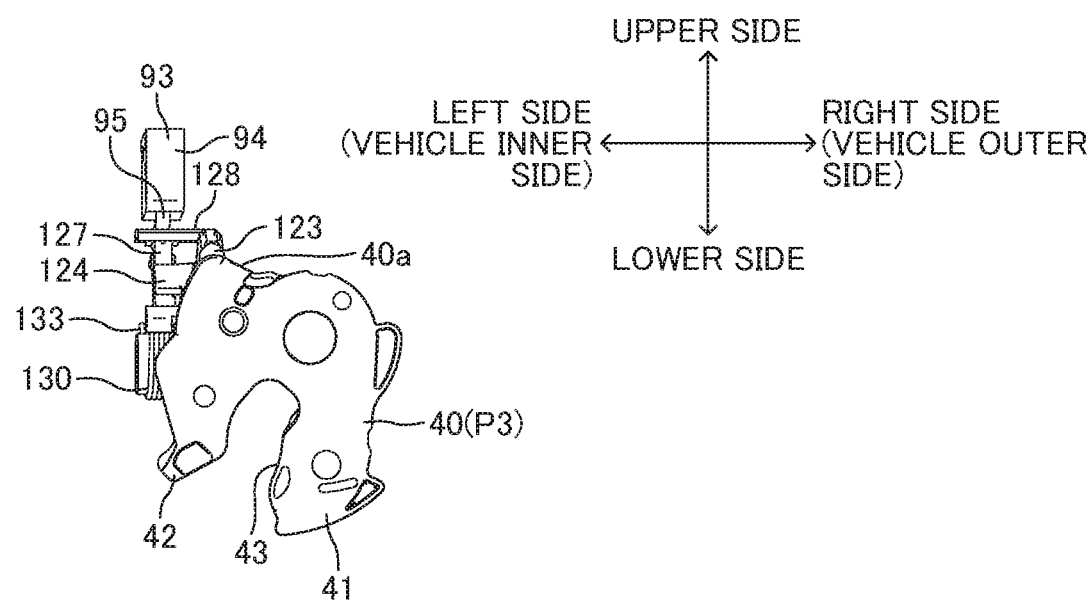
FIG. 27 is a back view, which is similar to FIG. 23, for illustrating the latch, the door switch, and the switch lever when the latch is positioned at the half-latched position.

When the latch 40 further pivots from the switching position P2 toward the unlatched position P4, the latch 40 reaches a half-latched position P3 illustrated in FIG. 26 and FIG. 27. Then, the arm distal end portion 123 of the first engagement arm 122 of the switch lever 120 is pushed upward by the first engagement surface 40a of the latch 40, and thus the switch lever 120 pivots about the pivot shaft 58 in the counterclockwise direction in FIG. 26 against the elastic urging force of the lever spring 130. As a result, although the switch pressing piece 128 of the switch lever 120 is brought into slide contact with the pressed projection 95 of the door switch 93, the door switch 93 is kept in the ON state.

Further, at this time, a horizontal distance Lc of the switch lever 120 is slightly larger than the distance L. Therefore, the arm distal end portion 123 of the first engagement arm 122 slides on the first engagement surface 40a of the latch 40, and then moves to a corner portion 40d (boundary portion between the first engagement surface 40a and the second engagement surface 40b).

As illustrated in FIG. 28 and FIG. 29, when the latch 40 further pivots from the half-latched position P3 to the unlatched position P4, a horizontal distance Ld of the switch lever 120 is slightly smaller than the horizontal distance Lc, that is, substantially equal to the distance L. In this case, an engaging position between the arm distal end portion 123 of the first engagement arm 122 of the switch lever 120 and the latch 40 is switched from the first engagement surface 40a to the second engagement surface 40b so that the arm distal end portion 123 slides on the second engagement surface 40b. That is, the pivoting position of the switch lever 120 itself does not almost change, but only the pivoting position of the latch 40 relative to the switch lever 120 changes. Therefore, the actuation state of the door switch 93 is kept in the ON state.

As described above, when the latch 40 is positioned within a pivoting range of from the switching position P2 to the unlatched position P4, the switch lever 120 pivots in interlock with the latch 40 so as to keep the actuation state of the door switch 93 in the ON state.

Further, while the arm distal end portion 123 of the first engagement arm 122 slides on the second engagement surface 40*b*, the elastic urging force of the lever spring 130 applied to the latch 40 through the switch lever 120 does not increase. Accordingly, the latch 40 can be prevented from pivoting unsmoothly.

In the embodiment described above, when a worker mounts the switch lever 120 and the lever spring 130 to the first housing 52, for example, by hand, the worker causes the switch lever 120, which is rotatably supported on the pivot shaft 58, to rotate from the outside position to the in-operation pivoting range. Then, the lever spring 130, which has been in a free state, is elastically deformed to generate the urging force for causing the switch lever 120 to pivot in the clockwise direction in FIG. 11 to FIG. 14 and the like.

However, by pivoting the switch lever 120 having the pivoting path determined by the pivot shaft 58 of the first housing 52, the worker causes the switch lever 120 to pivot from the outside position to the in-operation pivoting range. Therefore, at this time, although the urging force generated by the lever spring 130 is applied to, for example, hand of the worker as a load, the worker can easily pivot the switch lever 120 to the in-operation pivoting range.

Further, in order that the elastic deformation piece 129*b* of the switch lever 120 can easily climb over the temporary-assembly stopper 73 of the first housing 52 when the switch lever 120 pivots from the outside position to the in-operation pivoting range, it is required that mechanical strength of the elastic deformation piece 129*b* be set low. However, in a case in which the mechanical strength of the elastic deformation piece 129*b* is set low, when the temporary-assembly stopper 73 and the elastic deformation piece 129*b* are held in contact with each other for a long time by a pivot urging force of the lever spring 130, the elastic deformation piece 129*b* may be broken by the load applied from temporary-assembly stopper 73 to the elastic deformation piece 129*b*. Further, in the case in which the mechanical strength of the elastic deformation piece 129*b* is set low, under a state in which the temporary-assembly stopper 73 and the elastic deformation piece 129*b* are held in contact with each other, when an external force other than the urging force of the lever spring 130 is applied to the switch lever 120 so that the temporary-assembly stopper 73 and the elastic deformation piece 129*b* are brought into contact with each other with a strong force, the elastic deformation piece 129*b* may be broken by a strong load applied from the temporary-assembly stopper 73 to the elastic deformation piece 129*b*. If the elastic deformation piece 129*b* is broken, a worker is required to perform mounting work of the first housing 52 and the second housing 75 while positioning the switch lever 120 within the in-operation pivoting range, for example, by hand against the urging force of the lever spring 130. However, the mounting work in this case is not easy.

However, in this embodiment, when, after the switch lever 120 and the lever spring 130 are mounted to the first housing 52, the second housing 75 is mounted to the first housing 52, the assembly-completion stopper 90 of the second housing 75 is brought into contact with the second engagement arm 127 of the switch lever 120. Then, the elastic deformation piece 129*b* is separated from the temporary-assembly stopper 73, and this separation state is maintained. Accordingly, no load is applied from the temporary-assembly stopper 73 to the elastic deformation piece 129*b*.

Therefore, a risk of breakage of the elastic deformation piece 129*b* can be reduced while the mechanical strength of the elastic deformation piece 129*b* is set low in order that the elastic deformation piece 129*b* can easily climb over the temporary-assembly stopper 73. Accordingly, a worker can assemble the actuator unit 50 and the door lock device 20 easily and reliably.

The embodiment of the present invention has been described above but the present invention should not be construed as being limited to the above-mentioned embodiment.

For example, the door lock device 20 may be provided to a back door.

Further, the door, to which the door lock device 20 is applied, may pivot with respect to the vehicle body not only in the horizontal direction but also in the upward and downward direction.

Components corresponding to the latch housing 26 and the actuator housing 51 may be formed integrally with each other to construct one housing.

The switch pressing piece 128 may press the pressed projection 95 of the door switch 93 and thus switch the door switch 93 to the ON state when the latch 40 is positioned at the fully-latched position, and the switch pressing piece 128 may separate from the pressed projection 95 of the door switch 93 and thus switch the door switch 93 to the OFF state when the latch 40 is positioned between the switching position P2 and the unlatched position P4.

An electrical component other than the lighting device may be connected to the ECU, and the electrical component may be switched between an ON state and an OFF state in association with turning on or off of the door switch 93.

A portion corresponding to the elastic deformation piece 129*b* may be provided on the first housing 52, and a portion corresponding to the temporary-assembly stopper 73 may be provided on the switch lever 120.

However, in general, the first housing 52 and the switch lever 120 are each an integrally molded resin product. That is, the first housing 52 and the switch lever 120 are each manufactured through use of a molding die or a mold (not shown). Further, as is apparent from FIG. 9, FIG. 10, and the like, the first housing 52 has a larger size and a more complex shape than those of the switch lever 120. Accordingly, when the elastic deformation piece 129*b* is formed on the first housing 52, the structure of the first housing 52 becomes more complex. Accordingly, it is not easy to integrally mold the resin first housing 52 including the elastic deformation piece 129*b* through use of the molding die. More specifically, it is difficult to remove the molding die after the first housing 52 is molded.

Meanwhile, it is easy to integrally mold, through use of the molding die, the resin switch lever 120 having a smaller size and a simpler shape than those of the first housing 52. That is, in this case, it is easy to remove the molding die after the switch lever 120 is molded.

Further, as described above, the door lock device 20 includes a plurality of pivot lever groups that are urged to pivot by the urging means. Those pivot lever groups can be classified into four groups from the functional point of view. That is, those pivot lever groups can be classified into the latch 40, a latch interlocking lever group, a handle interlocking lever group, and an active lever interlocking lever group. The latch interlocking lever group pivots in interlock with the latch 40. The handle interlocking lever group pivots in interlock with the door handles (the outside handle 17 and the inside handle 18). The active lever interlocking lever group pivots in interlock with the active lever 103. Each of the latch interlocking lever group, the handle interlocking lever group, and the active lever interlocking lever group includes, for example, the following pivot levers described below.

The latch interlocking lever group includes the pole 45, the lift lever 48, and the switch lever 120.

The handle interlocking lever group includes the inside open lever 116 and the outside open lever 117.

The active lever interlocking lever group includes the open link 100.

Therefore, the present invention is applicable to at least one of the pivot levers which are included in the latch 40, any of the pivot levers other than the switch lever 120, which are included in the latch interlocking lever group, the handle interlocking lever group, and/or the active lever interlocking lever group.

When the present invention is applied to the latch 40, a range between the fully-latched position and the unlatched position corresponds to the "in-operation pivoting range" of the latch 40.

Further, when the present invention is applied to the pole 45 and/or the lift lever 48, the pivoting range of the pole 45 and/or the lift lever 48 when the latch 40 is moved between the fully-latched position and the unlatched position corresponds to the "in-operation pivoting range" of the pole 45 and/or the lift lever 48.

Further, when the present invention is applied to the inside open lever 116, the pivoting range of the inside open lever 116 when the inside handle 18 is moved between the initial position and the latch releasing position corresponds to the "in-operation pivoting range" of the inside open lever 116. Similarly, when the present invention is applied to the outside open lever 117, the pivoting range of the outside open lever 117 when the outside handle 17 is moved between the initial position and the latch releasing position corresponds to the "in-operation pivoting range" of the outside open lever 117.

Further, when the present invention is applied to the open link 100, the pivoting range of the open link 100 when the active lever 103 is moved between the unlocked position and the locked position corresponds to the "in-operation pivoting range" of the open link 100.

However, when the present invention is applied to the lift lever 48, the lift lever 48 is urged to pivot by the urging means integrated with the lift lever 48.

Further, when the present invention is applied to the inside open lever 116, the above-mentioned urging means configured to urge the inside handle 18 to pivot is omitted. Instead, provided is the urging means integrated with the inside open lever 116 and configured to urge the inside open lever 116 to pivot.

Similarly, when the present invention is applied to the outside open lever 117, the above-mentioned urging means configured to urge the outside handle 17 to pivot is omitted. Instead, provided is the urging means integrated with the outside open lever 117 and configured to urge the outside open lever 117 to pivot.

The present invention is also applicable to a pivot lever provided separately from the latch 40, the latch interlocking lever group, the handle interlocking lever group, and the active lever interlocking lever group.

Further, a type of the urging means configured to urge each pivot lever to pivot is not limited to the torsion coil spring.

Figure 30:
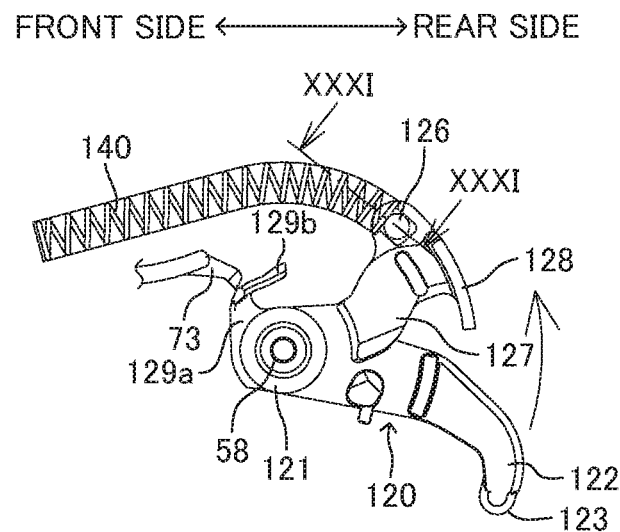
FIG. 30 is a side view for illustrating a part in a modification example of the present invention corresponding to a main part of FIG. 11.
Figure 31:
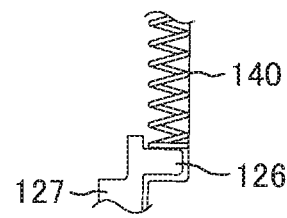
FIG. 31 is a sectional view taken along the line XXXI-XXXI of FIG. 30.
Figure 32:
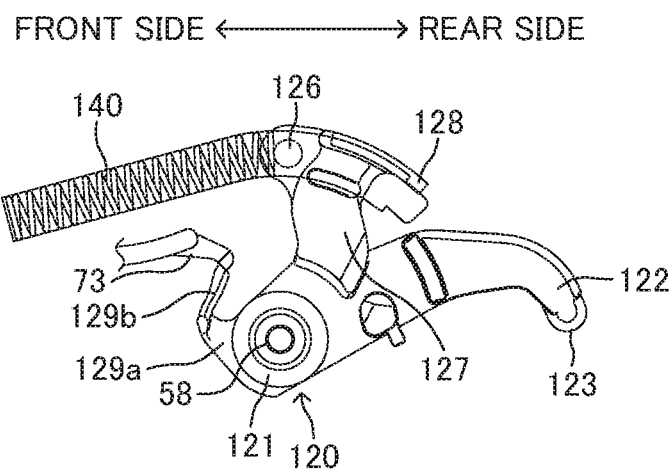
FIG. 32 is a side view for illustrating the part in the modification example of the present invention corresponding to a main part of FIG. 12.

For example, as illustrated in FIG. 30 to FIG. 32, the urging means configured to urge the switch lever 120 to pivot may include a lever spring 140 formed of a compression coil spring. One end portion (rear end portion) of the lever spring 140 is locked to a spring locking portion 126 formed on the second engagement arm 127 of the switch lever 120.

The switch lever 120 and the lever spring 140 integrated with each other in this manner are mounted to the first housing 52 through the following procedures.

First, as illustrated in FIG. 30, a worker (not shown) mounts the boss portion 121 to the pivot shaft 58 while holding the switch lever 120 by hand, and positions the switch lever 120 at the outside position with respect to the pivot shaft 58.

Further, the other end portion (front end portion) of the lever spring 140 is locked to a spring locking portion (not shown) formed on the first housing 52. At this time, the lever spring 140 is slightly curved as illustrated in FIG. 30. However, at this time, the lever spring 140 does not generate a pivot urging force for urging the switch lever 120 in the clockwise direction in FIG. 30.

Under this state, the worker causes, by hand, the switch lever 120 to pivot in the counterclockwise direction in FIG. 30. Then, as illustrated in FIG. 32, the elastic deformation piece 129b climbs over the temporary-assembly stopper 73 while being elastically deformed or bent to the boss portion 121 side. That is, the switch lever 120 is moved to the in-operation pivoting range. Then, the spring locking portion 126 pivots about the pivot shaft 58 in the counterclockwise direction in FIG. 30 and FIG. 32. As a result, the lever spring 140 is compressed. Accordingly, under the state illustrated in FIG. 32, the lever spring 140 is elastically deformed and generates the urging force for causing the switch lever 120 to pivot clockwise.

In this manner, by pivoting the switch lever 120 from the outside position to the in-operation pivoting range, the worker temporarily assembles the switch lever 120 and the lever spring 140 to the first housing 52. At this time, although the urging force generated by the lever spring 140 is applied to, for example, hand of the worker as the load, the pivoting path of the switch lever 120 is determined by the pivot shaft 58 of the first housing 52, and hence the worker can easily pivot the switch lever 120 to the in-operation pivoting range. That is, even when the present invention is carried out in this modification example, the same operations and effects as those of the above-mentioned embodiment can be obtained.

The invention claimed is:
1. A vehicle door lock device, comprising:
a base member which is fixed to a vehicle door supported on a vehicle body so as to be pivotable;
a pivot lever which is supported on the base member so as to be pivotable; and
urging means which is provided between the base member and the pivot lever and is configured to generate an urging force for causing the pivot lever to pivot in one direction when the urging means is locked to the base member and the pivot lever so as to be elastically deformed in a predetermined mode,
wherein the base member includes one of a temporary stopper and an elastic deformation piece,
wherein the pivot lever includes the other of the temporary stopper and the elastic deformation piece,
wherein the one of the temporary stopper and the elastic deformation piece is positioned on a pivoting path of the other of the temporary stopper and the elastic deformation piece when the pivot lever pivots,
wherein the urging means, when locked to the base member and the pivot lever, does not generate the urging force when the pivot lever is positioned at an outside position at which the pivot lever is positioned on the one direction side with respect to a predetermined in-operation pivoting range, and wherein, when the pivot lever pivots from the outside position to the in-operation pivoting range, the elastic deformation piece climbs over the temporary stopper while being elastically deformed, and the urging means locked to the base member and the pivot lever is elastically deformed to generate the urging force.

2. A vehicle door lock device according to claim 1, wherein the pivot lever comprises at least one of:
- a latch which is pivotable within the in-operation pivoting range between a fully-latched position at which the latch keeps the vehicle door in a closed state through engagement with a striker mounted to the vehicle body and an unlatched position at which the latch releases the striker;
- a latch interlocking lever which includes a lever configured to pivot within the in-operation pivoting range in interlock with the latch and/or the striker;
- a handle interlocking lever which is configured to pivot within the in-operation pivoting range in interlock with pivoting operation of a handle supported on the vehicle door so as to be pivotable and is configured to cause the latch to pivot to the unlatched position when the handle interlocking lever pivots in a predetermined direction in a predetermined lock releasable state; and
- an active lever interlocking lever which is configured to pivot within the in-operation pivoting range in interlock with a pivoting motion of an active lever that produces the lock releasable state when pivoting to a predetermined position.

3. A vehicle door lock device according to claim 1,
wherein the base member includes the temporary stopper, and
wherein the pivot lever includes the elastic deformation piece.

4. A vehicle door lock device according to claim 1,
wherein the base member includes:
- a first base member which is configured to support the pivot lever so as to enable the pivot lever to pivot, the urging means being locked to the first base member; and
- a second base member which is mountable to and dismountable from the first base member, and
wherein the second base member includes an assembly-completion stopper configured to separate the temporary stopper and the elastic deformation piece from each other and to position the pivot lever within the in-operation pivoting range through contact with the pivot lever when the second base member is mounted to the first base member and the pivot lever is positioned within the in-operation pivoting range.

5. A vehicle door lock device according to claim 1, further comprising a switch configured to detect a pivoting position of a latch,
wherein the pivot lever is a switch lever configured to link the latch and the switch with each other and to switch the switch between an ON state and an OFF state in interlock with a change in pivoting position of the latch.

* * * * *